(12) United States Patent
Altberg et al.

(10) Patent No.: US 9,094,506 B2
(45) Date of Patent: *Jul. 28, 2015

(54) SYSTEMS AND METHODS TO CONNECT MEMBERS OF A SOCIAL NETWORK FOR REAL TIME COMMUNICATION

(71) Applicant: YP Interactive LLC, Wilmington, DE (US)

(72) Inventors: Ebbe Altberg, Mill Valley, CA (US); Scott Faber, San Francisco, CA (US); Ron Hirson, San Francisco, CA (US); Sean Van der Linden, Berkeley, CA (US)

(73) Assignee: YELLOWPAGES.COM LLC, Tucker, GA (US)

(*) Notice: Subject to any disclaimer, the term of this patent is extended or adjusted under 35 U.S.C. 154(b) by 217 days.

This patent is subject to a terminal disclaimer.

(21) Appl. No.: 13/631,221

(22) Filed: Sep. 28, 2012

(65) Prior Publication Data

US 2013/0021951 A1  Jan. 24, 2013

Related U.S. Application Data

(63) Continuation of application No. 12/130,894, filed on May 30, 2008, now Pat. No. 8,295,465.

(60) Provisional application No. 60/975,097, filed on Sep. 25, 2007.

(51) Int. Cl.
   *H04M 3/42* (2006.01)
   *H04M 3/00* (2006.01)
   (Continued)

(52) U.S. Cl.
   CPC ........... *H04M 3/42068* (2013.01); *G06Q 30/02* (2013.01); *H04L 67/306* (2013.01);
   (Continued)

(58) Field of Classification Search
   CPC ... H04M 3/44; H04M 1/274558; H04M 3/42; H04M 3/5191; H04M 3/5183; H04M 3/5166
   USPC .............. 379/216.01, 265.09; 370/352–356, 370/259–271
   See application file for complete search history.

(56) References Cited

U.S. PATENT DOCUMENTS

4,741,025 A   4/1988  Maruyama et al.
4,796,293 A   1/1989  Blinken et al.
(Continued)

FOREIGN PATENT DOCUMENTS

EP   1638023   3/2006
GB   2329046   3/1999
(Continued)

OTHER PUBLICATIONS

"AtOnce Talks Up E-mail Marketing Campaigns with ITXC Push to Talk Service," Business Wire, Feb. 26, 2001.
(Continued)

*Primary Examiner* — Rasha Al Aubaidi
(74) *Attorney, Agent, or Firm* — Kilpatrick Towsend & Stockton LLP

(57) ABSTRACT

Methods and apparatuses to provide telephonic connections to members of a social network. One embodiment includes: identifying a first member connected to a second member in a social network; determining whether profile data of the first member of the social network includes a telephonic reference of the first member; presenting a user interface element to the second member over a data communication network in response to a determination that the profile data of the first member includes the telephonic reference of the first member; and responsive to a selection of the user interface element, initiating a first telephonic connection to the first member using the telephonic reference of the first member and a second telephonic connection to the second member to provide a telephonic connection between the first member and the second member.

20 Claims, 17 Drawing Sheets

(51) Int. Cl.
*G06Q 30/02* (2012.01)
*H04M 7/12* (2006.01)
*H04M 3/51* (2006.01)
*H04M 3/44* (2006.01)
*H04M 7/00* (2006.01)
*H04L 29/06* (2006.01)
*H04L 29/08* (2006.01)

(52) U.S. Cl.
CPC .......... *H04M 7/123* (2013.01); *H04L 65/1069* (2013.01); *H04L 67/24* (2013.01); *H04M 3/42365* (2013.01); *H04M 3/44* (2013.01); *H04M 3/5191* (2013.01); *H04M 7/0024* (2013.01); *H04M 2201/38* (2013.01); *H04M 2203/2072* (2013.01); *H04M 2203/655* (2013.01); *H04M 2207/35* (2013.01)

(56) References Cited

U.S. PATENT DOCUMENTS

| | | |
|---|---|---|
| 4,850,007 A | 7/1989 | Marino et al. |
| 4,963,995 A | 10/1990 | Lang |
| 5,057,932 A | 10/1991 | Lang |
| 5,099,510 A | 3/1992 | Blinken, Jr. et al. |
| 5,164,839 A | 11/1992 | Lang |
| 5,262,875 A | 11/1993 | Mincer et al. |
| 5,361,295 A | 11/1994 | Solomon et al. |
| 5,373,549 A | 12/1994 | Bales et al. |
| 5,436,957 A | 7/1995 | McConnell |
| 5,440,334 A | 8/1995 | Walters et al. |
| 5,483,352 A | 1/1996 | Fukuyama et al. |
| 5,483,588 A | 1/1996 | Eaton et al. |
| 5,524,146 A | 6/1996 | Morrisey et al. |
| 5,539,813 A | 7/1996 | Jonsson |
| 5,544,237 A | 8/1996 | Bales et al. |
| 5,555,298 A | 9/1996 | Jonsson |
| 5,559,875 A | 9/1996 | Bieselin et al. |
| 5,608,786 A | 3/1997 | Gordon |
| 5,619,555 A | 4/1997 | Fenton et al. |
| 5,644,715 A | 7/1997 | Baugher |
| 5,689,553 A | 11/1997 | Ahuja et al. |
| 5,696,965 A | 12/1997 | Dedrick |
| 5,710,970 A | 1/1998 | Walters et al. |
| 5,740,549 A | 4/1998 | Reilly et al. |
| 5,751,956 A | 5/1998 | Kirsch |
| 5,774,534 A | 6/1998 | Mayer |
| 5,793,851 A | 8/1998 | Albertson |
| 5,841,763 A | 11/1998 | Leondires et al. |
| 5,850,433 A | 12/1998 | Rondeau |
| 5,862,223 A | 1/1999 | Walker et al. |
| RE36,111 E | 2/1999 | Neville |
| 5,870,546 A | 2/1999 | Kirsch |
| 5,937,390 A | 8/1999 | Hyodo |
| 5,963,202 A | 10/1999 | Polish |
| 5,963,861 A | 10/1999 | Hanson |
| 5,978,567 A | 11/1999 | Rebane et al. |
| 5,991,394 A | 11/1999 | Dezonno et al. |
| 5,995,705 A | 11/1999 | Lang |
| 5,999,965 A | 12/1999 | Kelly |
| 6,108,704 A | 8/2000 | Hutton et al. |
| 6,131,085 A | 10/2000 | Rossides |
| 6,189,030 B1 | 2/2001 | Kirsch et al. |
| 6,208,713 B1 | 3/2001 | Rahrer et al. |
| 6,216,111 B1 | 4/2001 | Walker et al. |
| 6,223,165 B1 | 4/2001 | Lauffer |
| 6,243,684 B1 | 6/2001 | Stuart et al. |
| 6,269,361 B1 | 7/2001 | Davis et al. |
| 6,275,490 B1 | 8/2001 | Mattaway et al. |
| 6,301,350 B1 | 10/2001 | Henningson et al. |
| 6,327,572 B1 | 12/2001 | Morton et al. |
| 6,466,966 B1 | 10/2002 | Kirsch et al. |
| 6,470,079 B1 | 10/2002 | Benson |
| 6,470,181 B1 | 10/2002 | Maxwell |
| 6,510,417 B1 | 1/2003 | Woods et al. |
| 6,516,057 B2 | 2/2003 | Meek et al. |
| 6,529,878 B2 | 3/2003 | De Rafael et al. |
| 6,529,946 B2 | 3/2003 | Yokono et al. |
| 6,535,506 B1 | 3/2003 | Narain et al. |
| 6,542,750 B2 | 4/2003 | Hendrey et al. |
| 6,560,576 B1 | 5/2003 | Cohen et al. |
| 6,731,736 B2 | 5/2004 | Meek et al. |
| 6,760,537 B2 | 7/2004 | Mankovitz |
| 6,769,020 B2 | 7/2004 | Miyazaki et al. |
| 6,850,965 B2 | 2/2005 | Allen |
| 6,856,809 B2 | 2/2005 | Fostick |
| 6,859,833 B2 | 2/2005 | Kirsch et al. |
| 6,968,174 B1 | 11/2005 | Trandal et al. |
| 7,076,037 B1 | 7/2006 | Gonen et al. |
| 7,092,901 B2 | 8/2006 | Davis et al. |
| 7,103,010 B2 | 9/2006 | Melideo |
| 7,181,415 B2 | 2/2007 | Blaser et al. |
| 7,187,761 B2 | 3/2007 | Bookstaff |
| 7,200,413 B2 | 4/2007 | Montemer |
| 7,212,615 B2 | 5/2007 | Wolmuth |
| 7,227,936 B2 | 6/2007 | Bookstaff |
| 7,231,405 B2 | 6/2007 | Xia |
| 7,240,110 B2 | 7/2007 | Haitsuka et al. |
| 7,240,290 B2 | 7/2007 | Melideo |
| 7,363,254 B2 | 4/2008 | Skinner |
| 7,380,139 B2 | 5/2008 | Tagawa et al. |
| 7,434,175 B2 | 10/2008 | Melideo |
| 7,797,345 B1 | 9/2010 | Martino et al. |
| 8,077,849 B2 | 12/2011 | Altberg et al. |
| 8,295,465 B2 | 10/2012 | Altberg et al. |
| 8,452,655 B2 | 5/2013 | Altberg et al. |
| 8,473,386 B2 | 6/2013 | Altberg et al. |
| 2001/0048737 A1 | 12/2001 | Goldberg et al. |
| 2002/0003867 A1 | 1/2002 | Rothschild et al. |
| 2002/0010616 A1 | 1/2002 | Itzhaki |
| 2002/0026457 A1 | 2/2002 | Jensen |
| 2002/0057776 A1 | 5/2002 | Dyer |
| 2002/0085030 A1 | 7/2002 | Ghani |
| 2002/0086676 A1 | 7/2002 | Hendrey et al. |
| 2002/0095331 A1 | 7/2002 | Osman et al. |
| 2002/0107697 A1 | 8/2002 | Jensen |
| 2002/0122547 A1 | 9/2002 | Hinchey et al. |
| 2002/0193094 A1 | 12/2002 | Lawless et al. |
| 2003/0026397 A1 | 2/2003 | McCroskey |
| 2003/0046161 A1 | 3/2003 | Kamangar et al. |
| 2003/0083042 A1 | 5/2003 | Abuhamdeh |
| 2003/0105824 A1 | 6/2003 | Brechner et al. |
| 2003/0177017 A1 | 9/2003 | Chaudhuri |
| 2003/0195787 A1 | 10/2003 | Brunk et al. |
| 2003/0212600 A1 | 11/2003 | Hood et al. |
| 2003/0220866 A1 | 11/2003 | Pisaris-Henderson et al. |
| 2003/0223565 A1 | 12/2003 | Montemer |
| 2003/0225682 A1 | 12/2003 | Montemer |
| 2003/0231754 A1 | 12/2003 | Stein et al. |
| 2004/0003041 A1 | 1/2004 | Moore et al. |
| 2004/0006511 A1 | 1/2004 | Montemer |
| 2004/0010518 A1 | 1/2004 | Montemer |
| 2004/0043810 A1 | 3/2004 | Perlin et al. |
| 2004/0076403 A1 | 4/2004 | Mankovitz |
| 2004/0174965 A1 | 9/2004 | Brahm et al. |
| 2004/0174974 A1 | 9/2004 | Meek et al. |
| 2004/0193488 A1 | 9/2004 | Khoo et al. |
| 2004/0234049 A1 | 11/2004 | Melideo |
| 2004/0235524 A1 | 11/2004 | Abuhamdeh |
| 2004/0247092 A1 | 12/2004 | Timmins et al. |
| 2004/0249649 A1 | 12/2004 | Stratton et al. |
| 2004/0254859 A1 | 12/2004 | Aslanian |
| 2004/0260413 A1 | 12/2004 | Melideo |
| 2005/0004865 A1 | 1/2005 | Chudnovsky et al. |
| 2005/0018829 A1 | 1/2005 | Baker |
| 2005/0038876 A1 | 2/2005 | Chaudhuri |
| 2005/0041647 A1 | 2/2005 | Stinnie |
| 2005/0044238 A1 | 2/2005 | Jacob et al. |
| 2005/0074100 A1 | 4/2005 | Lederman |
| 2005/0076100 A1 | 4/2005 | Armstrong |
| 2005/0080878 A1 | 4/2005 | Cunningham et al. |
| 2005/0096980 A1 | 5/2005 | Koningstein |
| 2005/0100153 A1 | 5/2005 | Pines et al. |
| 2005/0105881 A1 | 5/2005 | Mankovitz |

(56) References Cited

U.S. PATENT DOCUMENTS

| | | | |
|---|---|---|---|
| 2005/0125416 | A1 | 6/2005 | Kirsch et al. |
| 2005/0135387 | A1 | 6/2005 | Rychener et al. |
| 2005/0171955 | A1 | 8/2005 | Hull et al. |
| 2005/0209874 | A1 | 9/2005 | Rossini |
| 2005/0216345 | A1 | 9/2005 | Altberg et al. |
| 2005/0240432 | A1 | 10/2005 | Jensen |
| 2005/0245241 | A1 | 11/2005 | Durand et al. |
| 2005/0261964 | A1 | 11/2005 | Fang |
| 2005/0267766 | A1 | 12/2005 | Galbreath et al. |
| 2005/0286688 | A1 | 12/2005 | Scherer |
| 2005/0289015 | A1 | 12/2005 | Hunter et al. |
| 2005/0289471 | A1 | 12/2005 | Thompson et al. |
| 2006/0003735 | A1 | 1/2006 | Trandal et al. |
| 2006/0004623 | A1 | 1/2006 | Jasti |
| 2006/0004627 | A1 | 1/2006 | Baluja |
| 2006/0004892 | A1 | 1/2006 | Lunt et al. |
| 2006/0031516 | A1 | 2/2006 | Kumer |
| 2006/0064404 | A1 | 3/2006 | Kshore et al. |
| 2006/0069610 | A1 | 3/2006 | Rossini |
| 2006/0075104 | A1 | 4/2006 | Kumer |
| 2006/0106711 | A1 | 5/2006 | Melideo |
| 2006/0136310 | A1 | 6/2006 | Gonen et al. |
| 2006/0143068 | A1 | 6/2006 | Calabria |
| 2006/0159063 | A1 | 7/2006 | Kumar |
| 2006/0166655 | A1 | 7/2006 | Montemer |
| 2006/0171520 | A1 | 8/2006 | Kliger |
| 2006/0173827 | A1 | 8/2006 | Kliger |
| 2006/0173915 | A1 | 8/2006 | Kliger |
| 2006/0182250 | A1 | 8/2006 | Melideo |
| 2006/0190336 | A1 | 8/2006 | Pisaris-Henderson et al. |
| 2006/0218225 | A1 | 9/2006 | Hee Voon et al. |
| 2006/0218577 | A1 | 9/2006 | Goodman et al. |
| 2006/0247999 | A1 | 11/2006 | Gonen et al. |
| 2006/0277108 | A1 | 12/2006 | Altberg et al. |
| 2007/0005750 | A1 | 1/2007 | Lunt et al. |
| 2007/0022011 | A1 | 1/2007 | Altberg et al. |
| 2007/0030824 | A1 | 2/2007 | Ribaudo et al. |
| 2007/0038507 | A1 | 2/2007 | Kumar |
| 2007/0100956 | A1 | 5/2007 | Kumar |
| 2007/0129054 | A1 | 6/2007 | Andronikov et al. |
| 2007/0130164 | A1 | 6/2007 | Kembel et al. |
| 2007/0160077 | A1 | 7/2007 | Altberg et al. |
| 2007/0269038 | A1 | 11/2007 | Gonen et al. |
| 2007/0282621 | A1 | 12/2007 | Altman et al. |
| 2007/0294078 | A1 | 12/2007 | Kim et al. |
| 2008/0016164 | A1 | 1/2008 | Chandra |
| 2008/0243586 | A1 | 10/2008 | Dohring et al. |
| 2008/0253363 | A1 | 10/2008 | Altberg et al. |
| 2008/0255946 | A1 | 10/2008 | Altberg et al. |
| 2008/0255976 | A1 | 10/2008 | Altberg et al. |
| 2008/0255977 | A1 | 10/2008 | Altberg et al. |
| 2008/0255989 | A1 | 10/2008 | Altberg et al. |
| 2008/0301310 | A1 | 12/2008 | Pulver et al. |
| 2009/0080635 | A1 | 3/2009 | Altberg et al. |
| 2009/0187459 | A1 | 7/2009 | Hayes, Jr. et al. |
| 2011/0040586 | A1 | 2/2011 | Murray et al. |
| 2013/0235765 | A1 | 9/2013 | Altberg et al. |
| 2013/0254317 | A1 | 9/2013 | Altberg et al. |

FOREIGN PATENT DOCUMENTS

| | | |
|---|---|---|
| KR | 20060050484 | 5/2006 |
| WO | 9847295 | 10/1998 |
| WO | 0057326 | 9/2000 |
| WO | 0127825 | 4/2001 |
| WO | 0128141 | 4/2001 |
| WO | 0244870 | 6/2002 |
| WO | 2008124695 | 10/2008 |

OTHER PUBLICATIONS

"ITXC Corp and Doubleclick Energize Banner Ads with Web Telephony; Companies Voice-Enable Banner Advertisements Using ITXC Push to Talk Service," Business Wire, Dec. 12, 2000.

ADS-Click, "ADS-click Adds Skype-Based Pay-Per-Call Advertising Capabilities to Its Private-Labeled Solution, which will be Unveiled at ad:tech New York," Market Wire, Oct. 10, 2005.

Greenberg, Ken, "Jambo Launches to Connect People and Businesses from the Internet to the Phone," Market Wire, May 3, 2005.

Greenberg, Ken, "Jambo Names Netzero Co-founder Stacy Haitsuka to New Post of Chief Information Officer," Business Wire, Jul. 5, 2005.

Greenberg, Ken, "Jambo Receives $5 Million in Financing from Kline Hawkes & Co., Westlake Venture Partners, Others," Business Wire, Oct. 17, 2005.

Ingenio, Inc., "FindWhat.com Enters Agreement with Ingenio to Offer Pay Per Call Advertising Platform," press release available at http://www.ingenio.com, Apr. 7, 2004.

Jambo, "Welcome to Jambo—The Leader in Pay-Per-Call Solutions," company information retrieved from http://www.jambo.com, available at least by Oct. 17, 2005.

Jingle Networks, Inc., "1-800-FREE411 Provides Two Great Opportunities to Acquire New Customers," available at least by Oct. 20, 2005.

Jingle Networks, Inc., "Introducing 1-800 FREE411: First Nationwide Free Telephone Directory Assistance Service," Sep. 20, 2005.

"Applying Technology News," Accounting Technology, p. 14, Feb./Mar. 1997.

"TriNet's 'Help Me, I'm Stuck' Internet Voice Button Services Pushes Web Pages to Online Users," Business Wire, Mar. 25, 1998.

Allexperts.com, company information retrieved from http://www.allexperts.com, available at least by Apr. 9, 2000.

Answers.com, company information retrieved from http://www.answers.com, available at least by Aug. 8, 2000.

Dalton, Gregory, "Rent-An-Expert on the Web," Information Week, p. 75, Sep. 6, 1999.

Exp.com, Inc., company information retrieved from http://www.exp.com, available at least by Sep. 20, 2000.

Expertcity.com, "About Us," company information retrieved from http://www.expertcity.com, available at least by Apr. 9, 2000.

Experts Exchange, Inc., company information retrieved from http://www.experts-exchange.com, available at least by Apr. 9, 2000.

Sterling, Greg, "Ingenio's Ether—Pay Per Professional Advice," Search Engine Journal, Mar. 3, 2006.

University of Texas—Austin, information on the Electronic Emissary Project retrieved at www.tapr.org/emissary, available at least by Apr. 9, 2000.

Wasik, Joann M., "Information for Sale: Commercial Digital Reference and AskA Services," Virtual Reference Desk, http://www.vrd.org/AskA/commAskA.html, Sep. 20, 1999.

Wieland, Heidi et al., "Expertcity.com Launches Premier Online Marketplace for Expert Services," PR Newswire, Aug. 30, 1999.

Cashmore, Pete, "Jaxtr—Free MySpace Phone Calls," located at http://mashable.com, Dec. 14, 2006.

International Application No. PCT/US2008/059583, Written Opinion and International Search Report, Oct. 6, 2008.

Marshall, Matt, "Jaxtr Finally Launches, an Easy Way to Phone," located at http://venturebeat.com/2006/12/14/jaxtr-finally-launches-an-easy-way-to-phone, Dec. 14, 2006.

Tedeschi, B. (Feb 9, 2014). Social networks: Will users pay to get friends? New York Times. Retrieved Feb. 21, 2013.

Wuyts, S., Stremersch, S., Van, d. B., & Franses, P. H. (2004). Vertical marketing systems for complex products: A triadic perspective. JMR, Journal of Marketing Research, 41(4), 479-487. doi: http://dx.doi.org/10.1509/jmkr.41.4.479.47015 retrieved Mar. 22, 2013.

*141*

| Create Ad | [?] Help |

Your ad is very important. Tell customers exactly what you're selling and why they should call you. Please review our Pay Per Call Ad Guidelines to ensure your ad is accepted and gets new customers calling your business today.

Ad Location Info

Business Name: [_____] (Sorry, no phone numbers)

☐ Use my Account Information

Address 1: [_____]

Address 2: [_____] (Optional)

City: [_____]

State: [-Select State- ▽]

Zip Code: [___]-[___]

Phone Number: ([___])[___]-[___]  Enter the number where you'd like to receive calls Fax: ([___])[___]-[___]

Ad Marketing Message

Millions of people online will see your ad. So, in line 1 write a strong headline explaining what you're selling. To get people calling your business, include a promotional offer in line 2. This encourages buyers to call you now! Please note: Line 1 and Line 2 must each a complete sentence. Tips for success
Examples of Promotional Offers:
  - Call today and get $5 off.
  - Free consultation – limited time.
  - Call now and save 10%.
You'll be able to include more information about your offer on the business profile page. Learn more Marketing Message Line 1: [_____] (35 characters)

Marketing Message Line 2: [_____] (35 characters)

Welcome, Joe Settings | Inbox | Sign Out

People / Jobs & Hiring / Services / Answers / My Profile / My Contacts

Answers Home | My Q&A | Ask | Answer

People Search: [          ]  [Search]  Advanced Search

Answers Home > Question

Lui Magarian
Owner, One Team
Technologies
>> View all my questions
453        455

451
Can VC invest in an LLC
Or would another form of incorporation be required in order to receive venture funding?
Posted 1 day ago in Venture Capital and Private Equity, Incorporation | Flag question as ...

457      459      Reply Privately | Forward to an Expert
[Answer]  [Suggest Expert]

461      467
Rob Berman (2nd)
Consultant in corporate communications, strategic planning and business development.
See all my answers
Best Answers in:
  Starting Up (3)
  Accounting (1)
☎ Call me ($30/15 mins)

A VC can invest in any type of corporate structure. However, that being said it will be harder to develop an exit strategy for the VC with an LLC versus a C-Corp.

Posted 1 day ago | Flag answer as ...

465

Furqn Naz
CEO at AKA Solutions, Inc.
See all my answers
Best Answers in:
  •
  •
  •

Welcome, Lisa  Settings | Inbox | Sign Out

| People | Jobs & Hiring | Services | Answers | My Profile | My Contacts |

Connections | Invitations | Other Contacts | Colleagues | Classmates

People Search: [        ]  [Search]  Advanced Search

Joe Smith (1st) ~471
Vice President of Program Management
San Francisco Bay Area

[Recommend this person]

Send email | Download vCard

| Profile | Recommendations | Connections |   473~ (☏ Call me) ($30/15 mins)

Current: Vice President of Program Management at ABC, Inc.

Past: Direct of Program Management at  475~
EFG, Inc.

Education: University of California, Berkeley

Connection: 118

Industry: Internet   477~

Websites: www.JoeSmith.com

Public Profile URL: www.networking.com/JoeSmith

Summary
Joe Smith is currently Vice President of  479~
Program Management at ABC, Inc.

Advertisements
Software Design
Definition Design and Development for an advantage.
☏ 800-325-4369

Joe Recommends
People (1)
Steve Sky
Senior Director, QA, Inc.
"Steve did an amazing job ..."

Joe's Connections (118)
Shared (23)
Jim Berman
Director, Engineering at ABC, Inc.

FIG. 15

SYSTEMS AND METHODS TO CONNECT MEMBERS OF A SOCIAL NETWORK FOR REAL TIME COMMUNICATION

CROSS-REFERENCE TO RELATED APPLICATIONS

This application is a continuation application of U.S. patent application Ser. No. 12/130,894, filed May 30, 2008, which claims the benefit under 35 U.S.C. 119(e) of Provisional U.S. Patent Application Ser. No. 60/975,097, filed Sep. 25, 2007, the disclosure of which is incorporated herein by reference.

TECHNOLOGY FIELD

At least some embodiments disclosed herein relate to communication connections in general and, more particularly but not exclusively, to connections for real time communications, such as connecting people for telephonic conversation, chat in text, voice and/or video, document sharing, screen-sharing, application sharing, etc.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a packet switched network for a telephone connection. A packet switched network is typical in a computer data environment. Recent developments in the field of Voice over Internet Protocol (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

A traditional directory assistance service allows a customer to find out a landline phone number and/or the address of business via a telephone call. The customer is charged a fee for the directory assistance call and an additional fee for further connecting the call to the landline phone number looked up via the directory assistance service. Some recent directory assistance services are free to use by the customers, but the customers are required to listen to advertisements before the requested information is provided to the customer.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, in one form of performance-based search advertising, an advertisement is included within a result page of a keyword search. Each selection ("click") of the advertisement from the results page is the measurable event for which the advertiser pays. In other words, payment by the advertiser is on a per click basis in such advertising.

A social network represents a social structure in which a network of nodes can be used to represent a network of individuals or organizations and the connections between the nodes in the network represent the direct social connections. Web sites can be used to register the social connections of members of a social network and provide features such as automatic address book updates, viewable profiles, services to introduce members to each other to make new social connections, etc. Some internet social networks are organized around business connections; and some internet social networks are organized around common interests.

SUMMARY

Described herein are methods and apparatuses to provide telephonic connections to members of a social network. Some embodiments are summarized in this section.

In one embodiment, a method includes: identifying a first member connected to a second member in a social network; determining whether profile data of the first member of the social network includes a telephonic reference of the first member; presenting a user interface element to the second member over a data communication network in response to a determination that the profile data of the first member includes the telephonic reference of the first member; and responsive to a selection of the user interface element, initiating a first telephonic connection to the first member using the telephonic reference of the first member and a second telephonic connection to the second member to provide a telephonic connection between the first member and the second member.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

FIG. 2 illustrates a user interface for the creation of an advertisement according to one embodiment.

FIG. 14 illustrates a system to connect customers to experts according to one embodiment.

FIG. 15 illustrates an example of providing advertisements via a social network according to one embodiment.

DETAILED DESCRIPTION

Figure 1:
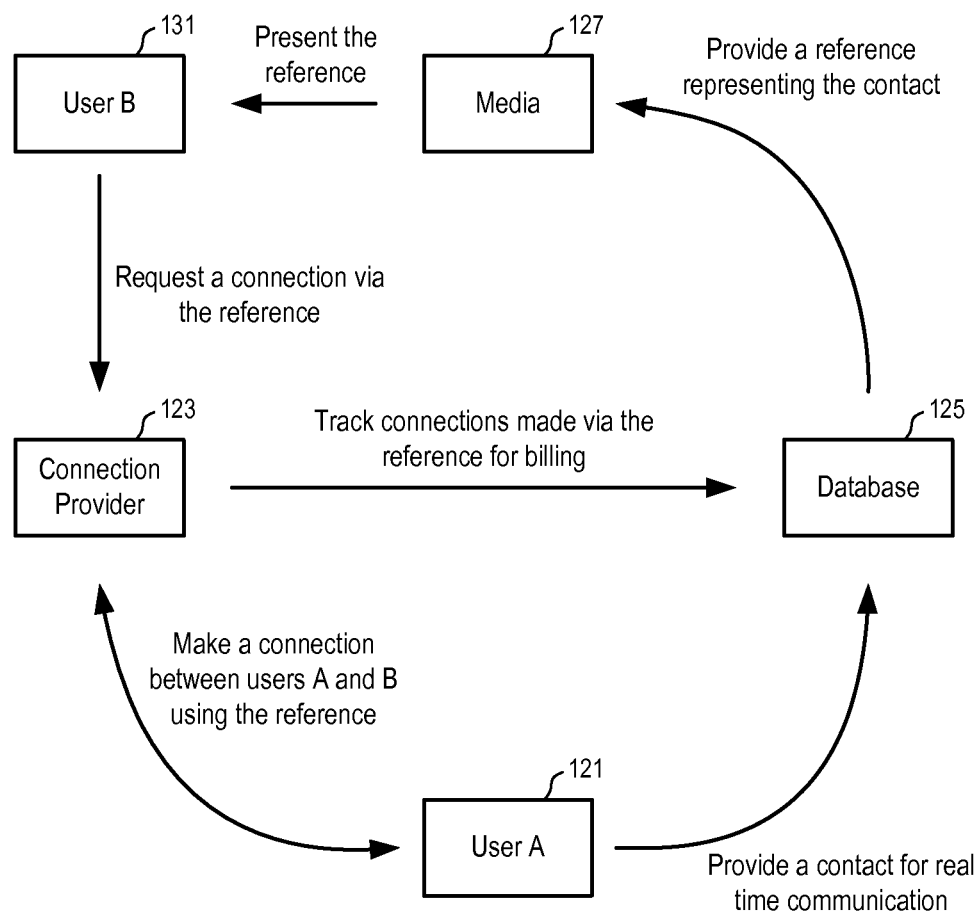
FIG. 1 shows a method to establish connections for real time communications according to one embodiment.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In the disclosure, the term "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

In one embodiment, a listing is presented to a user to provide the user with a communication reference, which can be used to request a connection for real time communications between the user and the entity of the listing, such as for telephonic conversations, instant messaging, chat in text, voice and/or video, screen sharing or application sharing, etc. The entity of the listing may be an advertiser who offers an advertisement fee for being presented, or a business entity, a seller, an advisor, an information provider, or a service provider, such as a provider for entertainment, amusement, etc. A listing may include text, graphical presentation, and/or audio or voice.

A listing may or may not be provided on behalf of an advertiser for a fee. For example, a directory service provider may compile listings of some businesses or sellers without the businesses or sellers explicitly request the directory service provider to advertise for them. A business or seller presented by a listing may or may not pay an advertisement fee for the presentation of the listing and/or for the lead to the customers resulting from the presentation of the listing.

For example, a community of users may create listings of businesses, sellers, etc. based on the recommendation of the users. In one embodiment, a listing can be created and edited by the community of users of telephonic apparatuses, such as softphones, cellular phones, or smart phones. The users can provide, edit, and/or modify a description, comments, ratings, etc., about a business or service provider that is identified by a telephonic reference, such as a telephone number of the business or service provider. Alternatively, the listings may have a portion of description that can be edited by the respective advertiser but not by other users. The listing database represents a business directory; and the entities represented by the listings may not pay any fee for being presented. Some of the entities may offer a fee for preferred placement in presentation. In one embodiment, the users may be charged a communication fee for communicating with the entities featured in the listings when the users use the softphones, cellular phones, or smart phones to communicate with the entities.

In one embodiment, an advertiser of an advertisement is charged an advertisement fee based on the performance of the advertisement (e.g., a telephonic connection to a customer, a lead for real time communication with a customer, a deal completed with the customer as a result of the performance, a subscription fee for a number of bundled leads or deals, etc.).

In one embodiment, a listing is provided to allow a customer to be connected to a seller; and the connection provider can charge the customer on behalf of the seller for transactions conducted over the connection provided between the customer and the seller. In one embodiment, the user terminals provided to the customer and the sellers are configured to charge the customer on behalf of the seller for the transactions. The customers and/or the sellers may also be charged for the communication connection. Alternatively, the communication connection may not be charged explicitly; and the communication cost can be covered via the commission fees for charging the customer on behalf of the seller and/or the advertisement fees.

In one embodiment, a presented listing includes a telephonic reference, which is used to identify an "end point" on a telephonic network for a telephonic connection to the "end point". The telephonic network may be a circuit switched network, or a packet switched network, or a combination of one or more circuit switched networks and one or more packet switched networks. For example, the telephonic reference may be a telephone number with an extension, a telephone number without an extension, a session initiation protocol (SIP) uniform resource identifier (URI), a user identifier of an instant messaging network, a user identifier of a Voice over Internet Protocol (VoIP) network, or a user identifier of a peer to peer VoIP network, etc.

In one embodiment, the telephonic references presented in some of the listings are references assigned by a connection server such that, when the references are used, the connection server is in the path of a call for a connection between the caller and the callee. For example, the connection server may be requested to call back the caller and to call the callee separately to connect the caller and the callee according to an assigned reference. For example, the connection server may receive a call, as an end point specified by an assigned reference, and then further connect the call to the callee based on the assigned reference used to receive the call. For example, the connection server may be queried to provide a telephonic reference of the callee according to an assigned reference to allow the caller's device to initiate the call to the callee using the provided reference. For example, the connection server may decrypt or decode an encrypted/encoded phone number of the callee for the caller's device and track the calls made by the caller's device through the decrypting or decoding process.

For example, in one embodiment, when an assigned reference is used to call for connections, the user is connected to a connection server as an end point. The connection server determines the communication reference of the advertiser based on the assigned reference used to connect the user and the connection server and then further connects the user to the advertiser. Through the use of the assigned reference, the connection server is in the path of connecting the user and the advertiser to track the connection made via the advertisement.

For example, the assigned reference can be a telephone number of the connection server, which when called by the user can be used to determine the telephone number of the advertiser; and the telephone number of the advertiser can be used to further connect the call to the advertiser. For example, the assigned reference may be a reference to request a callback to the user to connect to the advertiser. For example, the assigned reference can be an identifier of the advertiser, such as a user ID of the advertiser, a SIP URL of the advertiser, etc. The assigned reference can be passed to the connection server in a call signaling message of a VoIP call, be used to request a server to resolve the reference into a direct reference for use in a network, or be used to report to a server about the call to the advertiser.

In another embodiment, the telephonic references for some of the listings are designed to be used on telephonic apparatuses which are configured to track the calls made via the telephonic references and/or to report the calls made via the telephonic references. Thus, information about the calls made via the telephonic references can be used at a server to bill advertisers per connections made via the advertisements, to charge the customers on behalf of advisers (or sellers, service providers), to compensate partners based on the call activities, etc.

In a further embodiment, the telephonic references for some of the listings are designed to be used on telephonic apparatuses which are configured to maintain account information, or to communicate with servers of financial institutions to bill advertisers, and/or charge the customers on behalf of advisers, sellers or service providers.

In one embodiment, the user terminals that are designed to make the connections via the advertisement use the assigned reference to track the connections and report to a server the connection made via the advertisement. For example, softphones can be designed to make direct connections over a peer to peer network, without going through a centralized connection server. The softphones can be configured to report the calls made via the advertisements to a server for tracking. Alternatively, the softphones may be configured to deduct fees, or transfer funds, via accounts maintained by the softphones, or accounts accessible individually by the softphones.

In one embodiment, a click to call button includes a reference to the callee, which when selected, causes a telephonic apparatus used by the user, such as a softphone, a cellular phone, or a smart phone, to start a process to call the callee. The reference to the callee may be a SIP address of a connection server encoded with a phone number of the callee, which can be decoded by the connection server to further connect the call to the callee. The reference to the callee may be an encrypted phone number of the callee, which is to be decrypted by a server to allow the telephonic apparatus to call the callee directly (e.g., via a peer to peer network). In one embodiment, the reference can further include parameters such as the search terms used to locate the listings, the time stamp of the search, an electronic coupon/promotion, a bid price for advertisement fee, and/or a price for the service offered by a seller, etc. In one embodiment, the telephonic apparatus is configured to report a call resulted from the advertisement to a server for tracking and/or billing purposes.

In another embodiment, a click to call button is designed to request a connection server to call back to the customer for a connection to the entity of the listing. The click to call button may cause the presentation of an interface to guide the customer through the calling processing and/or to collect a callback reference from the customer (e.g., via a web page). In some embodiments, the callback reference, such as the telephone number of the customer, can be determined automatically from the identity of the customer, or the identity of the device used by the customer. For example, a telephone number of the customer can be looked up from the account of the customer after the customer is authenticated.

In one embodiment, a telephonic apparatus is a softphone implemented at least in part via software, such as an instant messenger, a VoIP client application running on a computer, an applet embedded in a web page, a built-in or plug-in module of a web browser, a handheld device, a personal digital assistant, a cellular phone, a cordless phone, a Bluetooth phone, a WiFi phone, etc. The telephonic apparatus may be designed to make a connection based on Internet Protocol, based on a peer to peer network, based on software, and/or based on a connection to a server or a host computer, etc. In some embodiments, the telephonic apparatus is implemented via hardwire circuitry, such Application-Specific Integrated Circuit (ASIC); in some embodiments, the telephonic apparatus is implemented partially via special purpose hardware circuitry and partially via software, such as Application-Specific Integrated Circuit (ASIC) or Field-Programmable Gate Array (FPGA) with software/firmware; and in some embodiments, the telephonic apparatus is implemented using a set of general purpose hardwire components that are under the control of software.

FIG. 1 shows a method to establish connections for real time communications according to one embodiment. In FIG. 1, user A (121) provides a contact for real time communication, such as a telephone reference of the user A. The contact can be used to establish a connection with user A (121) through a communication network. For example, the contact can be a telephone number of a landline, traditional analog telephone, a cellular phone number, a phone number with an extension, a Universal Resource Identifier (URI) such as a Session Initiation Protocol (SIP) URI, a user identifier of a VoIP application, a user identifier of an instant messaging system, etc.

The contact of the user A (121) is stored in the database (125); and a reference is assigned to represent the contact. Instead of providing the contact to customers, the reference representing the contact is provided through the media (127) to user B (131). Thus, when the user B (131) uses the reference to request a connection with the user A (121), the connections resulted from the advertisement can be tracked to evaluate the performance.

In one embodiment, advertisements can be distributed via a number of media channels operated by a number of demand partners. The reference can also be assigned to identify the demand partners and/or the media channels used to distribute the advertisements. In one embodiment, the information obtained from tracking the demand partners who are responsible for the delivery of a communication lead is used to compensate the demand partner for each delivered communication lead. Alternatively, the demand partners may be compensated according to the advertisement presentations made for the advertiser; and tracked information can be used to determine the performance and/or the cost effectiveness of the media channels.

In one embodiment, the reference can be presented via a variety of media channels, such as a virtual reality environment, newspaper, magazine, telephone directory, web search results, VoIP user terminals, interactive maps, banners, directory assistance service, online marketplace, mobile communication devices, radio, cable/satellite television, interactive television, web television, voice portal, web portal, online auction site, blog, email, bulletin board, refrigerate magnet, brochure, etc.

In FIG. 1, the user B (131) can use the reference obtained from media (127) to request the connection provider (123) to establish a connection or facilitate a communication channel for real time communications between the user A (121) and the user B (131). The connection provider uses the database (125) to determine the contact of the user A (121) and make a connection between the user A (121) and user B (131) using the contact of the user A (121). Alternatively, the reference may include an encoded/encrypted version of the contact of the user A (121) which can be decoded/decrypted without relying upon the database (125).

In response to the user B's request for a connection, the connection provider (123) may establish two separate connections to the user A (121) and the user B (131) and then bridge the two connections to connect the user A (121) and user B (131). For example, the connection provider (123) may determine the reference from a connection established between the user B (131) and connection provider (123) and then further bridge the connection to the user A (121).

In one embodiment, the connection provider (123) may provide a separate reference to represent the user B (131) and allow the user A (121) to subsequently callback to the user B (131) via the reference that represents the user B (131), if the user A (121) is not currently available for real time communications. The connection provider (123) may schedule an appointment for the user A (121) and user B (131) for a real time communication session. The connection provider (123) may send a notification to the user A (121) to inform the user A (121) about the request for a real time communication.

Alternatively, the user terminal of the user B (131) may provide the encoded/encrypted version of the contact of the user A (121) to the connection provider for a decoded/decrypted version of the contact of the user A (121) just in time when the user terminal of the user B (131) is ready to make a direct connection with a user terminal of the user A (121). For example, the user terminal of the user B (131) can use the decoded/decrypted contact of the user A (121) to make a peer to peer connection with the user terminal of the user A (121) without going through the connection provider (123); and providing the decoded/decrypted contact can be considered a proxy event of a connection between the user terminal of the user B (131) and the user terminal of the user A (121). Alternatively or in combination, the user terminal of the user B (131) and/or the user terminal of the user A (121) can be configured to report to the connection provider the connection between the user terminals. For example, a reporting message may include a call detail record (CDR), indicating the time period of the connection.

In one embodiment, the connection provider (123) tracks the connections made via the reference for billing for the advertisement. For example, the connection provider (123) may charge the advertiser for each communication lead deliver to the user A (121).

A communication lead may be limited to a distinct, separate customer such that repeated calls from the same customer within a predefined time period may not be counted as separate communication leads. In one embodiment, the communication lead may also be limited by the duration of a communication session, such that a short session having a duration shorter than a predefined time period may not be counted as a communication lead, and/or a long session having a duration longer than a predefined time period may be counted as more than one communication lead.

In one embodiment, a number of communication leads may be bundled as a package for a subscription fee, or a bid price. Further, the delivery of communication leads may be bundled with an offer of a telecommunication service package. Alternatively, the advertiser may specify a bid price that is to be charged for each communication lead delivered, or a bid limit (e.g., maximum bid) which is to be resolved into an actual bid based on the bid prices of competitors in a category for a specific geographic service area.

FIG. 2 illustrates a user interface for the creation of an advertisement according to one embodiment. The user interface may be presented via web in a web browser.

In FIG. 2, an interface (141) allows the advertiser to describe an offer (or a switch pitch, or a cross sell, or some advertising content). The advertiser can specify the business contact information for the advertisement, including the business name, street/mailing address, phone number and fax number. The advertiser/seller is encouraged to tell customers via concise marketing messages what is being offered and why the customers should call the advertiser/seller. For example, the advertiser is encouraged to include promotional offers in the marketing messages to get buyers to call the advertiser. Examples of promotional offers include: "Call today and get $5 off," "Free consultation—limited time," and "Call now and save 10%."

In one embodiment, an audio and/or visual advertisement is generated based at least in part on the information submitted by the advertiser via the user interface (141) (e.g., for presentation via virtual realty, directory assistance service, search result, etc.)

In one embodiment, a short audio advertisement is generated based on the concise marketing message (e.g., two sentences, each having a length limit, such as 35 characters). The concise marketing message can be read by a human to generated a recorded audio file for a short audio advertisement, or be converted into an audio message via a text-to-speech synthesizer. In one embodiment, the audio advertisement also includes the business name.

In one embodiment, a visual presentation of the advertisement may be used to supplement the audio advertisement. For example, the address of the advertisement can be presented in a visual advertisement, together with additional information that is specified in the business profile page of the advertisement. In response to a request from the customer, the visual component of the advertisement can be sent to the customer via an SMS message, via an email, via a custom application, via a web/WAP page, etc.

In one embodiment, the advertisement is sent to a user device in text according to a pre-determined format (e.g., in XML or a custom designed format) to allow a client application running on the user device to present the advertisement in a custom format. For example, the client application may present the short marketing advertisement in an audio form via a text-to-speech synthesize and the present a selected portion of the advertisement as an animation (e.g., present an electronic coupon via an animation). For example, a Java applet can be downloaded into the browser of the user to facilitate VoIP-based phone communication and perform at least part of the text-to-speech operations to enable improved compression in transmitting audio advertisements.

In one embodiment, when an advertisement is presented to the user via a web or a virtual reality environment, the short audio advertisement can also be included; and the audio advertisement can be played automatically or after the user selects the advertisement.

In FIG. 2, the interface (141) may be implemented as a web page. Alternatively, an advertisement may submit the advertising content via a custom client application, or via a message gateway (e.g., an instant message, an email, an SMS message, etc.). In one embodiment, one or more advertisements can be uploaded into a server via a spreadsheet, or via a web service interface.

In one embodiment, the system converts the text input received from the advertiser into an audio advertisement. In one embodiment, the audio file for the advertisement is stored in the advertisement database; alternatively, the text input can be converted into the audio advertisement (e.g., via a text-to-speech synthesizer, or a human announcer) when the audio advertisement is needed. In one embodiment, the machine synthesized audio recording are stored in the database for a period of time and deleted if not used after a predetermined period of time, or when the usage of the audio advertisement is lower than a threshold.

Figure 3:
FIG. 3 illustrates a user interface for the creation of a listing according to one embodiment.

FIG. 3 illustrates a user interface for the creation of a listing according to one embodiment. In FIG. 3, an entity can create a listing of service that can be delivered via a real time communication connection, such as a telephonic connection. The interface (143) allows the entity to specify a listing name with tags that can be used to categorize the listings and/or to facilitate searching. For example, the tags of the listing can be used to match with the search criteria of a customer, the content of document in which the listing is to be presented, etc.

In FIG. 3, the interface (143) allows the entity (e.g., an advisor, an entertainer, an information provider, a consultant, etc.) to specify the price of the service offered by the entity. For example, the entity may allow a customer to talk to the entity for free for a period of time specified in the entry box (145), or allow an indefinite period of free communication time. For example, the entity may request the customer to accept a charge after a period of free time, or request the customer to accept a charge before being connected to the entity. For example, the entity may request the customer to accept a per minute price before the customer is being connected to the entity for real time communication. Alternatively, the entity may provide a period of free communication time to the customer for a taste of the service, before requiring a per minute price specified in the interface (143).

In FIG. 3, the entity can also specify a price for a specified period of time, such as $25.00 for 30 minutes and a policy to continue beyond the 30 minutes. For example, the entity may request $25.00 for each additional 30 minutes in a communication session, or request the system to end the call after the initially purchased 30-minute communication session, or no long charge the customer if the customer wishes to continue the conversation beyond the initially purchased 30-minute communication session.

In one embodiment, the entity can specified a set of multiple prices for different purchase options; and the entity can negotiate with a customer during an initially free communication time period to select a price.

Alternatively, the entity may be compensated according to a flat rate specified by the system for services provided to the customers of the system.

Figure 4:
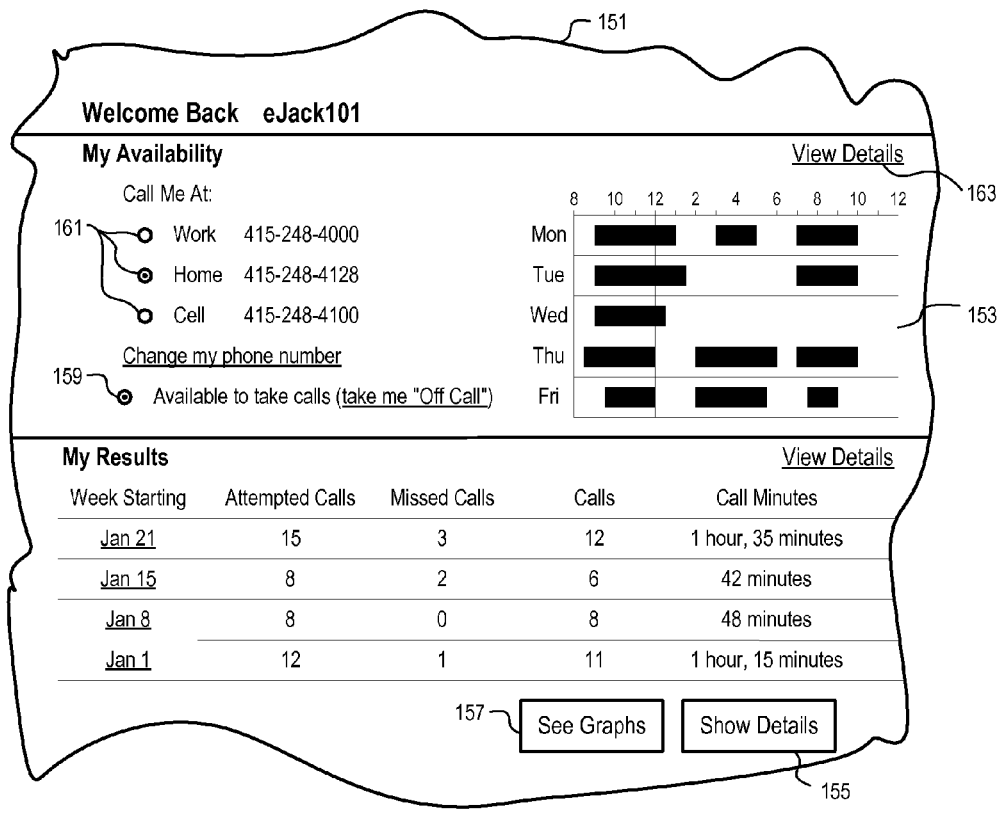
FIG. 4 illustrates an example of a user interface to manage availability for receiving phone calls according to one embodiment.

FIG. 4 illustrates an example of a user interface to manage availability for receiving phone calls according to one embodiment. An advertiser may specify the day and time of availability for accepting the calls for real time communications. Based on the availability, the system may schedule the presentation of the advertisements/communication references more effectively and block unwanted calls.

In one embodiment, the system can store multiple phone numbers of the seller. The system can intelligent route a call to the seller according to the preference of the seller. For example, in FIG. 4, the advertiser/seller may choose a preferred phone number from a set of phone numbers of the seller to receive incoming calls using the option group (161) in the user interface (151). The seller may indicate whether the seller is currently available to take calls or is to be taken "off call" (e.g., using the check box (159)).

In one embodiment, the owner of the listing (e.g., seller, advertiser, advisor, entertainer, consultant, etc.) can request the system to make concurrent calls to the multiple phone numbers. The owner of the listing can use any of the telephonic apparatuses connected at the multiple phone numbers to answer the call.

For example, an advertiser may have multiple telephonic apparatuses at different telephonic references. A connection server can assign a telephonic reference to an advertisement of the advertiser. When a customer calls the connection server at the telephonic reference assigned to the advertisement, the connection server can further connect the call from the customer to the advertiser via multiple concurrent calls to the different telephonic references of the advertiser. Thus, the advertiser can take the call to talk to the customer via any of the multiple telephonic apparatuses of the advertiser.

In one embodiment, during the conversation between the customer and the advertiser, the advertiser may request the connections server to reconnect the call to a different telephonic apparatus. For example, the connection server can place one or more separate concurrent calls to the telephonic references that are currently not in use for the conversation between the customer and the advertiser and then join the separate calls with the existing calls in a conference. This allows the advertiser to switch from one phone to another during the conversation and to bring family, friends, colleagues and/or third parties into the conversation.

In one embodiment, separate concurrent calls can be placed to the telephonic references of the advertiser that are specified prior to the customer's call, such as specified via the user interface (151). Alternatively, the advertiser can request a separate call to a telephonic reference specified in the request during the conversation with the customer. For example, the advertiser may provide the telephonic reference of a third party to invite the third party to join the conversation.

In one embodiment, the system is configured to drop the other concurrent calls when the one of the concurrent calls is answered. Thus, the first answering telephonic apparatus is selected for the connection, although multiple concurrent calls were initially placed.

In one embodiment, when multiple telephonic apparatus of the customer (or the advertiser) are answered substantially at the same time in response to the concurrent calls, one of the answering telephonic apparatus is selected for the connection while the others are disconnected. The selection can be performed based on a set of predefined priorities among the telephonic references, or based on statistics data about past answered calls. For example, the frequencies of the calls being answered on the multiple telephonic references can be used to select the telephonic apparatus that most frequently answered the previous concurrent calls (e.g., previous concurrent calls within the same time window of the day as the current call). For example, the telephonic apparatus that most recently answered the prior concurrent calls can be selected for the current connection request. Alternatively, a random selection from the answering devices can be used to select telephonic apparatus for the current connection request.

In one embodiment, the multiple telephonic references of the advertiser are called for up to a predetermined period of time to allow one or more of the multiple concurrent calls being answered. One or more answered calls can be joined with the call (or calls) with the other party in a conference. This provides a convenient mechanism to set up a conference call among multiple persons between the customer and the advertiser.

Alternatively, the multiple telephone numbers of the advertiser can be called sequentially to connect the advertiser to the customer.

In one embodiment, the system allows the seller to specify the schedule to receive calls; and the schedule (153) is displayed to the seller in a graphical way to help the seller to manage calls. In FIG. 4, the user interface (151) includes a link (163) which can be selected to display a user interface (not shown in FIG. 4) to manage the schedule (153).

In one embodiment, when the schedule or the check button (159) indicates that the advertiser/seller is currently not available to take calls for real time communications, the system can decrease the priority of the advertisement for this advertiser, or stop temporarily the presentation of advertisements for this advertiser. When there is a call intended for the advertiser at a time when the advertiser is not taking calls (e.g., according to the schedule), the system can block the call, or direct the call into a voice mail for the advertiser, or arrange a call at an alternative time, or obtain a callback number to allow the advertiser to initiate a callback to the customer.

In FIG. 4, the user interface (151) also includes a summary of call activities. Buttons (157 and 155) can be selected to show graphical representation of the call activities and further details of the call activities.

As the phone calls pass through the system, a wide array of information can be collected and tracked, including day/date/time of calls, duration of calls, call status (answered, no answer, busy), inbound phone numbers, etc. Such tracked information can be used in counting communication leads generated from advertisements. For example, when multiple calls are made from the same user to the same seller within a period of time (e.g., a day or a week), or in connection with the same offered or auctioned item, these multiple calls can be considered as one qualified call or a single lead.

In one embodiment, different types of communication references can be dynamically selected for advertisements to represent the contact information of the corresponding advertisers. A communication reference used to represent the contact of an advertiser may be a traditional phone number with or without an extension, a click-to-call reference, a SIP address for VoIP call, a click-to-reveal reference, etc. The communication reference can be embedded into an advertisement to count the communication leads generated from advertisements, to track the contributions of demand partners who operate media channels to present the advertisements to customers, and/or to track other aspects of advertising, such as partners who bring the advertisers/sellers to the system and the keywords responsible for the selection of the advertisement for presentation.

In one embodiment, the tracking mechanism used for a particular version of a particular advertisement is selected from a number of available mechanisms, based on one or more considerations such as the volume or frequency of calls generated from the advertisement, the conversion rate of the advertisement (e.g., the ratio between a count of presentations of the advertisement and a count of communication leads generated from the presentations), the price per communication lead that the advertiser is willing to pay for the advertisement according to a price bid specified by the advertiser, a potential revenue for a particular party in the advertising activity, a classification or category of the advertisement (e.g., the category of service or product advertised in the advertisement), a geographical area served by the advertisement, the demand partner who is going to present the advertisement (e.g., the success rate of the demand partner in reaching viable customers in comparison with other demand partners), etc.

Figure 5:
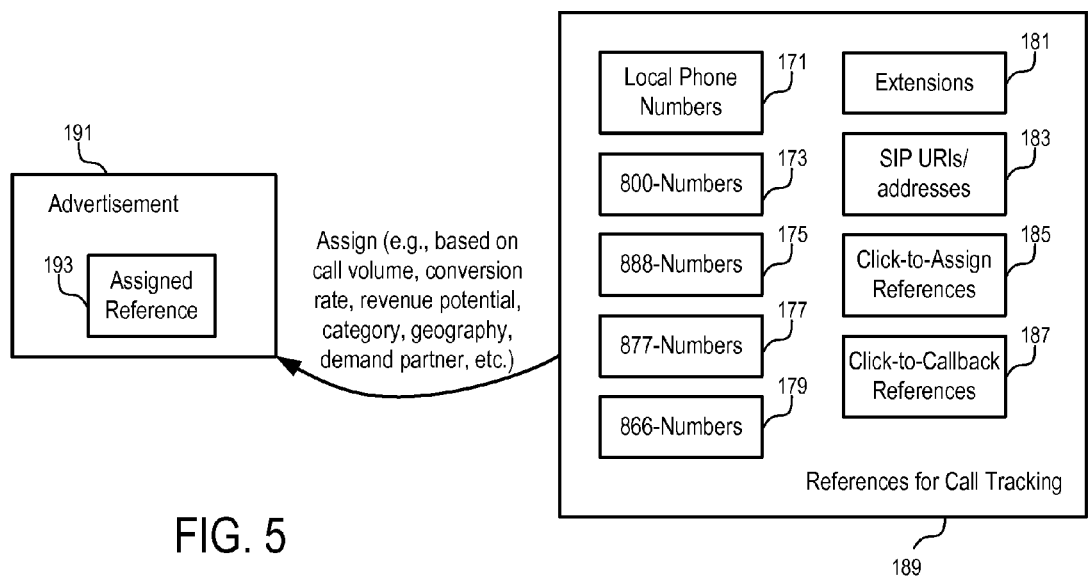
FIG. 5 shows a diagram illustrating a method to select a type of tracking mechanism with a corresponding reference for embedding in an advertisement according to one embodiment.

FIG. 5 shows a diagram illustrating a method to select a type of tracking mechanism with a corresponding reference for embedding in an advertisement according to one embodiment. In FIG. 5, multiple types of tracking mechanisms are used in the system. The tracking mechanism used for an advertisement or a version of the advertisement can be dynamically selected and changed. For example, different versions of an advertisement can be generated for delivery by different demand partners.

In FIG. 5, a pool (189) of different types of references is maintained, such as local phone numbers (171), 800-numbers (173), 888-numbers (175), 877-numbers (177), 866-numbers (179). Some of the references can be dynamically generated and used, such as extensions (181), SIP addresses (183), click-to-assign references (185) and click-to-callback references (187). In one embodiment, one or more of the references are selected and used as the assigned reference (193) that is embedded in the advertisement (191). In one embodiment, the assignment is based at least partially on factors related to the advertisement, such as call volume, conversion rate, revenue potential, category, geography, demand partner, etc.

In one embodiment, the reference of a particular type is selected and assigned to the advertisement when the advertisement is being requested for delivery. When the advertisement is subsequently requested, the previously assigned reference can be used. Alternatively, when the advertisement is subsequently requested, a different reference of a re-selected type can be selected and assigned to the advertisement, based on the considerations such as the call volume in a past time period, conversion rate, price bid, etc. After the new reference is assigned to the advertisement, the previous reference can be assigned to a different advertisement.

In one embodiment, before the expiration of the previously assigned reference for an advertisement delivered by a demand partner, a new reference can be assigned to the advertisement for delivery by the same demand partner. Thus, multiple references can be associated with a same set of parameters in a time period. Further, since some of the references can be re-assigned to a different advertisement, one reference may be associated with multiple sets of parameters (e.g., for different advertisements). In one embodiment, when a reference is associated multiple sets of parameters, the parameter set that is most recently assigned to and associated with an advertisement has the highest priority; and when the reference is used to request a communication connection with an advertiser, the customer can be prompted to confirm the set of parameters (directly or indirectly) before the set of parameters are used to connect the customer to the advertiser.

In one embodiment, a communication reference that is specific to a selected tracking mechanism is allocated or selected or generated for a particular advertisement. The communication reference is embedded into the advertisement to generate a particular version of the advertisement.

In one embodiment, the tracking mechanism is selected at a time when the particular version of the advertisement is needed for presentation (e.g., when the version of the advertisement is to be delivered to a media channel, a demand partner, or to a web browser of a customer). The corresponding communication reference is allocated or selected or generated when the tracking mechanism is selected.

In one embodiment, the selected tracking mechanism can be dynamically changed at a time when the particular version of the advertisement is needed for presentation (e.g., when the version of the advertisement is to be delivered to a demand partner or to a web browser of a customer). For example, the tracking mechanism used in an advertisement that is to be presented via a particular demand partner can be upgraded or downgraded based on the statistical data collected from the past activities related to the advertisement.

In one embodiment, a version of an advertisement can have multiple assigned references corresponding to different types of tracking mechanisms. For example, a version of an advertisement may include a SIP address, a reference to arrange a callback and a reference to request an assigned phone number.

The SIP address may be presented in a click-to-call format via a VoIP application. When the customer has a VoIP application readily available, the customer may choose to make the phone call via the SIP address without requesting for a traditional telephone number.

The reference to arrange a callback can be implemented as a link or a button labeled as "Request a phone connection through calling me back". In one embodiment, a form to take the callback number is presented with the link or button. Alternatively, when the link or the button is selected, a further interface (e.g., a web page, a dialog box, etc.) can be displayed to guide the customer through the process of connecting the customer to the advertiser through calling back the customer.

The reference to request an assigned phone number can be implemented as a link or a button labeled as "Show me a phone number", which when selected, causes a phone number to be assigned to the version of the advertisement. After a phone number is assigned to the version of the advertisement, the advertisement can be subsequently displayed with the assigned phone number without showing the reference to request an assigned phone number.

Alternatively, when the "Show me a phone number" link or button is selected, the complete phone number of the advertiser can be shown to allow the customer to call the advertiser directly. In such an implementation, the number of times that the advertiser's phone number is clicked to reveal can be used as a performance indicator, based on which the advertisement is charged for.

In one embodiment, after a period of time of serving the advertisement, statistical data related to consumer responses to the advertisement can be collected and used to adjust the tracking mechanisms for the advertisement. For example, if it is determined that the majority of the phone calls in response to the advertisement is via the SIP address, other tracking mechanisms may be de-allocated from the advertisement, or re-allocated for a different advertisement. Alternatively, the reference may be phased out from the advertisement while the reference is allocated to a different advertisement.

For instance, if an advertisement has a high call volume (e.g., receives many calls), it may be upgraded for a more expensive method of tracking. An advertisement with an extension may be upgraded to a local phone number without an extension, or even a vanity toll-free number, if the performance of the advertisement is above a threshold (e.g., when its conversion rate or call volume is high). Conversely, advertisements that perform poorly may be downgraded in tracking methods used. For example, an advertisement tracked by a toll-free number without an extension may be downgraded to have a number with an extension, a click-to-call connection mechanism.

The tracking mechanism of an advertisement can be determined not only by the performance of an advertisement, but also by the quality of the demand partner or the quality of the customer viewing the advertisement. For example, one advertisement may use an expensive tracking mechanism on one demand partner but may be assigned a different, inexpensive tracking mechanism on a second demand partner who tends to have lower quality customers (e.g., customers who response less frequently to advertisements). The quality of a demand partner may be reflected upon on the difference in the conversion rate of a same advertisement presented via different demand partners, in the numbers of the potential customers the demand partners can reach, the quality of the customers of the demand partners, etc. In another embodiment, the tracking mechanism is directly determined by the quality of the customer himself/herself. For instance, information can be collected about the customer interacting with the advertisements; if the customer is a frequent buyer, an expensive tracking mechanism can be used for the customer. The quality of a customer may also reflected upon the preferences of the customer, the spending habit of the customer, the response rate of the customer to advertisements, the need of the customer, etc. In this case, different customers of different buying tendencies may see the advertisement using different tracking mechanisms at the same demand partners.

In one embodiment, the likelihood of an advertisement being called is estimated based on the type of media channels used to present the advertisement, the demand partner responsible to deliver the advertisement, and/or the customer who views the advertisement. Any characteristics in advertising that have an impact on the likelihood of an advertisement being called and thus the expected revenue/profit generated from the presentation of the advertisement can be used in selecting a tracking mechanism for the particular instance of the advertisement.

In one example, if it is determined that the number of communication leads generated from the assigned phone number is lower than a threshold, the assigned phone number may be reallocated to another advertisement. If the number of communication leads generated from the advertisement is higher than a threshold, the tracking mechanism used for the advertisement may be promoted to a phone number with a short or vanity extension, a phone number without an extension, a vanity phone number, a toll free phone number, a vanity toll free number, a local phone number, or a vanity local phone number. If the number of communication leads generated from the advertisement is lower than a threshold, the tracking mechanism may be downgraded, freeing up tracking resources for other advertisements.

In one example, when advertisements are provided to a demand partner that has a lower success rate in reaching viable customers than other demand partners, this demand partner may be represented using a long extension, leaving short extensions for other demand partners. Alternatively, the advertisements for presentation by the demand partner may be tracked using references for callback or SIP addresses.

In one example, the system may promote the advertisement activities in one geographic area; and the advertisements served in that geographic area receive upgrades in tracking mechanism.

In one example, the advertisements in certain categories of products and services use upgraded tracking mechanisms.

In one embodiment, the advertisements with a pay per communication lead price bid higher than a threshold receives an upgrade in tracking mechanism.

In one embodiment, the system determines weighting factors in various types of communication references (e.g., in terms of cost and benefit in promoting the advertisement), the success rate of the advertisement in various communication channel/demand partner, and the price bids of the advertisers. Based on the collected information, the system can select tracking mechanisms to optimize the potential revenue that can be generated from advertising. In one embodiment, the potential revenue includes the advertisement revenue and/or other revenue that can be generated from the advertisement. For example, when the system takes a commission from the transaction resulted from the advertisement, the potential revenue can include the expected commission from the presentation of the advertisement; and in such a case the system may further use the statistical data related to the successful rate of a call converting into a transaction, an average value of a transaction, the possibility of a repeated call, the average value of a repeated call, etc., in the determination of the potential revenue. In one embodiment, advertisements may qualify for better tracking mechanisms when their pay-per-call bid price reaches a certain value. Similarly, advertisements may qualify for better tracking mechanisms when their overall value reaches a certain threshold. Their overall value can be a function of their bid price, ordinal position, conversion rate, demand source, customer quality, etc.

Figure 6:
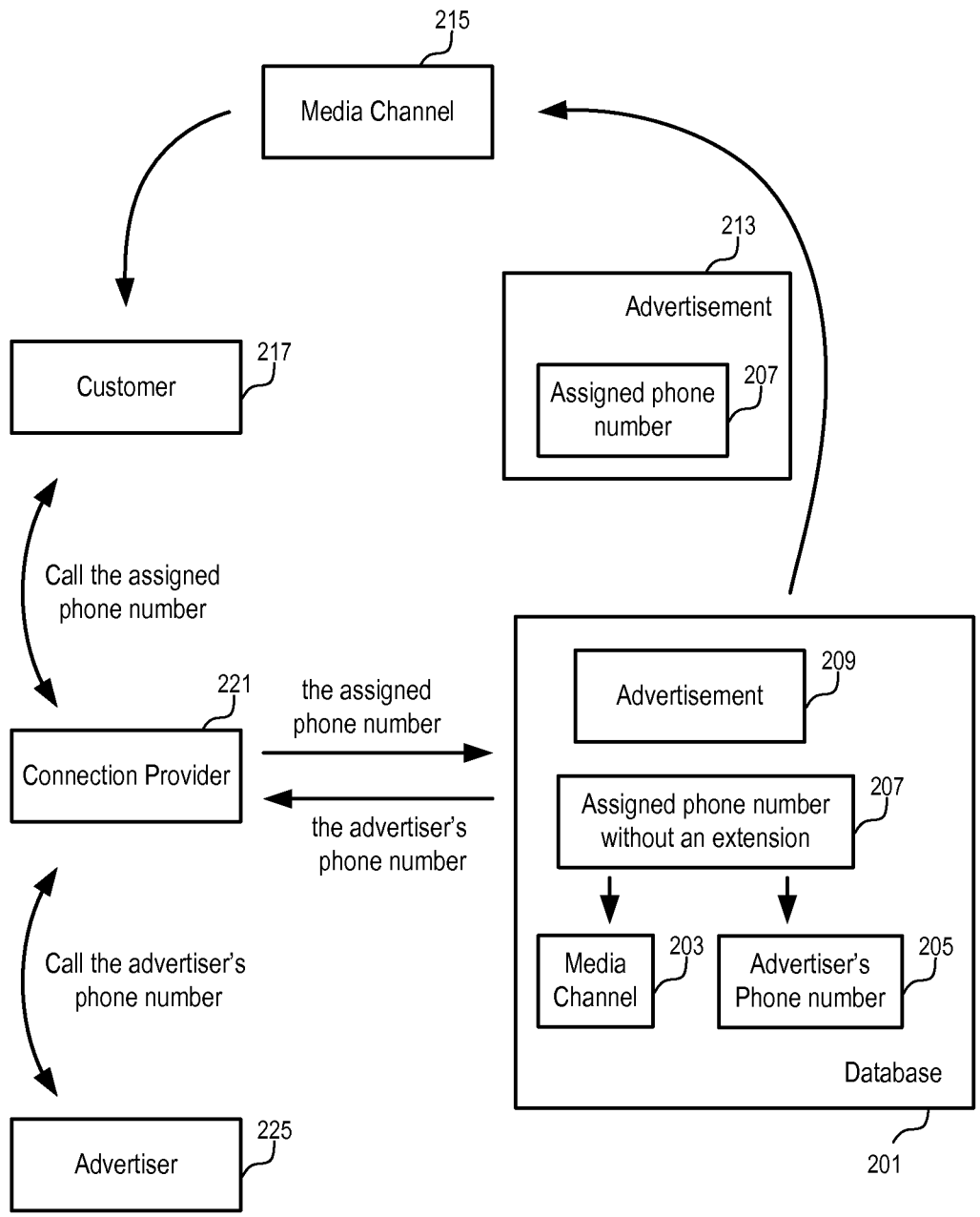
FIG. 6 illustrates an example of telephone call tracking mechanisms which can be selected according to one embodiment.

FIG. 6 illustrates an example of telephone call tracking mechanisms which can be selected according to one embodiment.

In FIG. 6, a phone number (207) without an extension is assigned for the generation a particular version (213) of an advertisement (209). In the database (201), the assigned phone number (207) is associated with the media channel (203) and the advertiser's phone number (205) (and/or other parameters to be tracked). Thus, the parameters to be tracked can be identified based at least partially on the assigned phone number (207). The particular version (213) of the advertisement (209) that has the assigned phone number (207) is provided to the customer (217) via the media channel (215). The advertisement may instruct or suggest the customer to call the assigned phone number (207) to reach the advertiser. In response to the advertisement, the customer may call the assigned phone number (207). When the connection provider (221) is called at the assigned phone number via a telephone carrier, the connection provider (221) can identify the assigned phone number (e.g., via a Dialed Number Identification Service (DNIS)) and determine the advertiser's phone number (205) based at least partially on the assigned phone number (207). Further, using the assigned phone number, it can also be determined that the phone call from the customer is a response to an advertisement that is delivered via the media channel (215) based on the association between the assigned phone number (207) and the media channel (203) in the database (201).

In one embodiment, after determining the advertiser's phone number from the assigned phone number that is dialed by the customer (217), the connection provider (221) makes a separate call to the advertiser (225) via a telephone carrier. When both the customer (217) and the advertiser (225) are on the line with the connection provider (221), the connection provider (221) can bridge or conference the calls to connect the customer (217) and the advertiser (225). Alternatively, the connection provider (221) may forward the calls from the customer (217) to the advertiser (225) after determining the advertiser's phone number.

In one embodiment, the assigned phone number can be a phone number that is local to the area to be served by the advertisement. Alternatively, the assigned phone number can be a toll free phone number, such as an 800-(888-, 877, or 866-) number. In one embodiment, the assigned phone number is a vanity number that spells one or more words on a dial pad on a phone, such as 1-800-PLUMBER for the advertisement of a plumber. Alternatively, the assigned phone number can be a plain phone number.

It is recognized that a local phone number is easy to dial manually, a vanity number is easy to remember, and an 800-number is easier to remember than other toll free numbers. Thus, there are different values in advertising in the different types of assigned phone numbers.

Since maintaining different phone numbers may increase the tracking cost, another type of tracking mechanism uses different extensions to differentiate tracked parameters. For example, different root phone numbers can be used to represent different media channels; and different extensions can be used to represent different advertisers. In another example, different root phone numbers are used to represent different advertisers; and different extensions are used to represent different media channels. In another example, the entire assigned phone number, including the root phone number and the extension, is used as a key to look up the media channel and the advertiser's phone number. In a further example, the root phone numbers are not used to differentiate tracked parameters; and the tracked parameters are represented by the extensions, which may be implemented as keys to look up the parameters or as encoded/encrypted version of the parameters.

In one embodiment, after the customer dials the root number, the customer is connected to an IVR system or a human operator of the connection provider/tracker. After the customer provides the extension to the IVR system or the human operator, the tracked parameters, such as the media channel and/or the advertiser's phone number, can be determined.

In one embodiment, the IVR system or the human operator can prompt the customer for the extension that is provided in the advertisement. When the dialed root number is sufficient to identify information about the media channel, the IVR system or the human operator may customize the prompt to include the information of the media channel and ask the customer to further provide the extension to reach the desired advertiser. When the dialed root number is sufficient to identify information about the advertiser, the IVR system or the human operator may customize the prompt to include the information of the advertiser and ask the customer to further provide the extension to reach the desired advertiser.

The extension can be a plain extension or a vanity extension that spells one or more words on a dial pad on a phone, such as extension PLUMBER for the advertisement of a plumber. In one embodiment, extensions used in the system can have different lengths. A shorter extension is easy to dial; and a vanity extension is easy to remember. In one embodiment, the extension includes an encoded/encrypted version of the associated parameter to allow an authorized data system to decode/decrypt at least some of the parameters without having to query the database. Thus, different types of extensions can have different values in advertising.

The tracking methods described can have different costs. A toll-free number with many extensions, for instance, is much cheaper than many vanity toll-free numbers. Therefore, the system uses the more expensive methods when it's worthwhile to do so. For instance, if an advertisement receives many calls, it may be selected for a more expensive method of tracking. An advertisement with an extension may in the future be upgraded to a local phone number without an extension, or even a vanity toll-free number. Similarly, an advertisement may qualify for a more expensive method of tracking if its conversion rate is high (e.g., if it has a high ratio of the number of calls it receives to the number of times it is displayed). Conversely, advertisements that perform poorly may be downgraded in tracking methods used. For example, an advertisement tracked by a toll-free number may be downgraded to have a less expensive, click-to-call connection mechanism.

In one embodiment, the connection provider calls the customer instead of providing a phone number to receive a phone call from the customer. For example, the reference assigned to represent the contact of the advertiser may not be used to make a call via a traditional telephone carrier. The reference can be submitted to the connection provider via a data communication, such as an email, an SMS message, a web request, or other types of data communication. The reference can be used as a key in the database to look up the associated parameters, such as the media channel and the advertiser's phone number. In one embodiment, the reference is an encoded/encrypted version of the associated parameters, such that an authorized data system can decode/decrypt the information without having to look up from the database. After the reference is provided to the connection provider with the request for a connection, the connection provider can callback to the customer to establish the connection between the customer and the advertiser. The request may include a callback phone number of the customer. Alternatively, a customer may be prompted to provide the callback phone number in response to the request. The connection provider can connect the customer and the advertiser by calling the customer and the advertiser separately and bridge/conferences the calls, or by forwarding one call (e.g., the call to the customer) to another (e.g., to the advertiser).

In one embodiment, a telephone number assigned to a version of an advertisement includes a SIP address for the initiation of a VoIP-based telephone call. The SIP address can be used for a manually dialed call on a SIP-enabled phone, or be used in a click to call format. In one embodiment, the SIP address includes an encoded/encrypted version of the contact of the advertiser such that the connection provider can decode/decrypt the contact of the advertiser from the SIP address without having to look up from database.

In one embodiment, the allocation of a telephone number to an advertisement is deferred to a stage when a customer is interested in the advertisement and ready to make a phone call. A reference embedded in the advertisement can be used to specifically request for the telephone number that is assigned to the advertiser by the connection provider. The request can be sent as a web request in response to a click on a link, or as an email, an SMS message, or an instant message. The assigned telephone number may be a toll free phone number without extension, a local phone number with an extension, a SIP URL, etc. Alternatively, the reference can be used to request the actual phone number of the advertiser.

Figure 7:
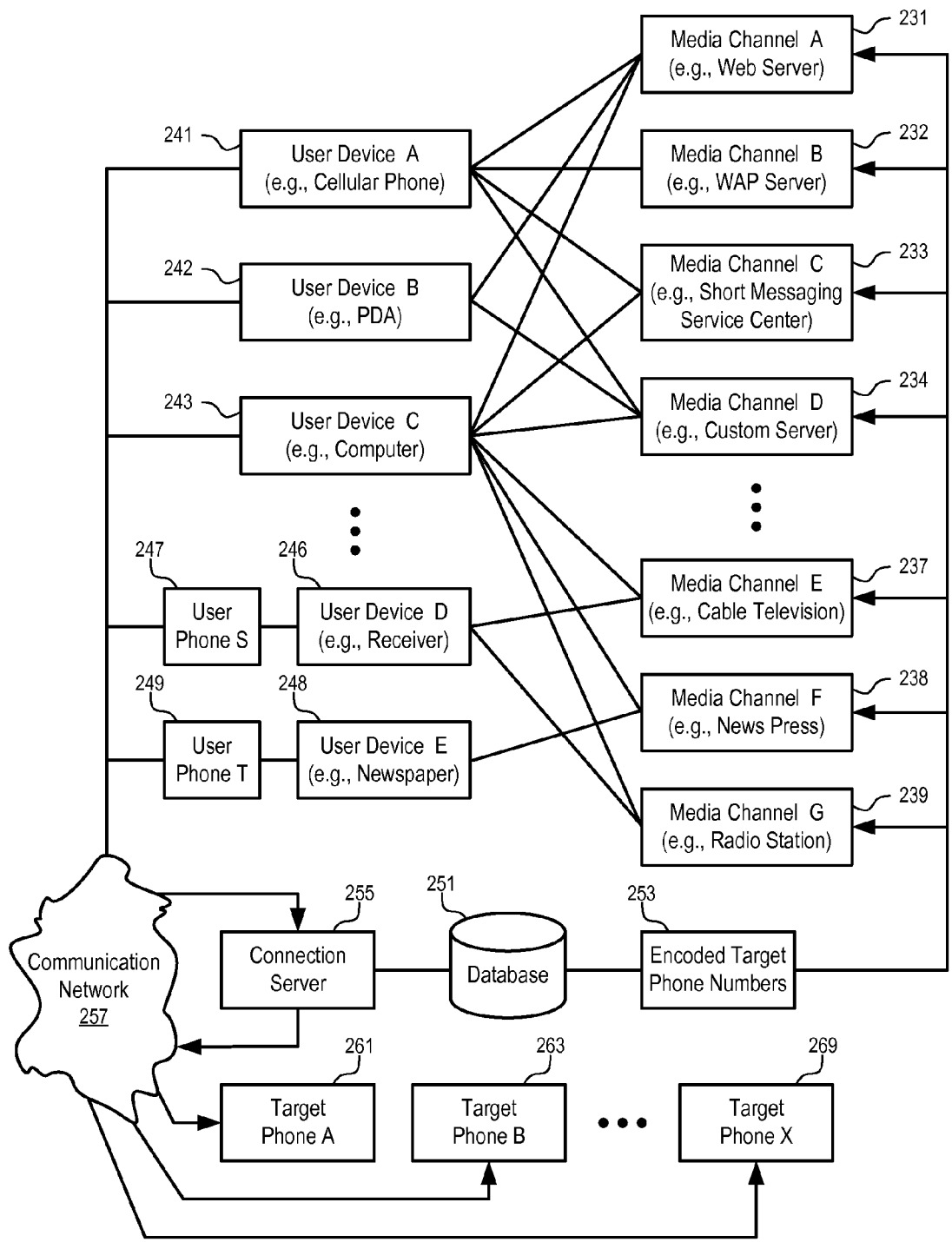
FIG. 7 shows a diagram of a system to make and track phone connections according to one embodiment.

FIG. 7 shows a diagram of a system to make and track phone connections according to one embodiment. In FIG. 7, a database (251) may contain the phone numbers of target phone A (261), target phone B (263), . . . , target phone X (269), etc. Typically, the target phones belong to the institutions, businesses, individuals, etc, which seek for publicity through various media channels, such as media channel A (231) (e.g., web server), media channel B (232) (e.g., WAP server), media channel C (233) (e.g., short messaging service center), media channel D (234) (e.g., custom server), media channel E (237) (e.g., cable television), media channel E (238) (e.g., news press), media channel G (239) (e.g., radio station), and others such as virtual reality, directory assistance service, interactive maps, etc.

In one embodiment, the phone numbers of the target phones are not directly publicized over the media channels. Instead, encoded target phone numbers (253) are used. Using the encoded target phone numbers (253), a user cannot reach target phones directly. The encoded target phone numbers (253) allow the association of additional information with the target phone numbers, such as the media channels used, special promotions, etc.

The encoded target phone numbers are delivered with content information (e.g., web page, WAP page, short message, television programs, news articles, virtual reality, etc.) to user devices, such as user device A (241) (e.g., cellular phone), user device B (242) (e.g., personal digital assistant (PDA)), user device C (243) (e.g., computer), user device D (246) (e.g., receiver), user device E (248) (e.g., newspaper).

In one embodiment, a user device can include a USB phone, a Bluetooth wireless phone, or one or more speakers or headphones with one or microphones for the implementation of a software based phone (softphone).

In one embodiment, the user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. In one embodiment, the user devices/phones support the display of virtual reality.

In one embodiment, the user device can include a television set to receive the advertisement. Further, the television set may have the capability to accept user input so that the television content may be changed according to the user input (e.g., interactive television, web television, internet television, etc.), or be coupled with a set top box which has such capability. The user input may be provided to the content provider through the same communication channel in which the television content/programs are delivered (e.g., a cable system of a cable television system), or a separate channel (e.g., a phone line, an Internet connection, etc.). The user input may include a request to make a connection to an advertiser featured in an advertisement presented in a television program, such as a request for a telephonic connection to the advertiser.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, an SMSC, CHTML, etc.).

In one embodiment, a user device is capable to dial a phone call (e.g., automatically according to the encoded phone number embedded in the content information when a user selects the number). Alternatively, a user may manually dial a phone call using a separate phone, such as user phone S (247) or user phone T (249).

In one embodiment, dialing at least a portion of an encoded target phone number connects the phone call to a connection server (255) first. According to the encoded target phone number dialed, the connection server (255) determines the corresponding target phone number using the database (251) and connects the phone call to the corresponding target phone (e.g., one of target phones 261-269) through the communication network (257).

Note the communication network (257) may be circuit switched, packet switched, or partially circuit switched and partially packet switched. For example, the telephone network may partially use the Internet to carry the phone call (e.g., through VoIP). For example, the connection between the user phone/device and the connection server (255) may be carried using VoIP; and the connection between the connection server (255) and the target phone may be carried using a land-line based, circuit switched telephone network.

In one embodiment, the information associated with the encoded target phone number, such as the media channel used to provide the encoded target phone number to the users, is also decoded/retrieved using the database (251). Thus, the information associated with the encoded target phone number can be tracked/stored.

In one embodiment, the connection server (255) also determines the phone number of the user through Automatic Number Identification (ANI). ANI is a phone system feature that provides the billing phone number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the connection server (255). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the connection server (255) through the communication network (257); and a second portion of the encoded target phone number is to be decoded by the connection server (255). For example, the Dual Tone Multi-Frequency (DTMF) decoder can be installed in the connection server (255) to detect the second portion of the encoded target phone number dialed at the user phone. The detected phone number can then be used to recover the target phone number. In one embodiment, a human operator or an interactive voice response (IVR) system can be used to receive the second portion of the encoded target phone number for decoding.

When an encoded target phone number has more digits than a standard phone number, the additional digits can be implemented as a telephone extension, or as input to an IVR system. In one embodiment, an encoded target phone number includes a Session Initiation Protocol (SIP) address for the initiation of a VoIP call to the system.

In one embodiment, a single telephone number is used to reach the connection server (255) for different target phone numbers; and the portion of the encoded target phone number that is used to reach the connection server (255) is not used in determining the information associated with the encoded target phone number.

Alternatively, multiple telephone numbers can be used to reach the connection server (255); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel. For example, when a query is received at the server of the system, the system assigns phone numbers for the advertisements that satisfy the query.

In one embodiment, a look-up table approach is used to encode the information. For example, the database (251) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of fields separated by "*" or "#". Each of the fields can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the connection server (255). When such a mapping scheme is used, a look up table is not necessary. For example, an encoded target phone number may include a first portion that is the phone number of the connection server (255), a second portion that is the target phone number appended with a number mapped from an identifier of the media channel. To prevent the user from dialing the target phone number directly, an encryption/scrambling scheme can be used to encode the second portion, which is decoded at the connection server (255).

In one embodiment, the connection server (255) determines the target phone number from the encoded target phone number dialed by the user and then dials the target phone number for the user and joins/bridges the phone calls so that the user can talk to the target phone.

In one embodiment, users dial the encoded target phone numbers manually. A user can dial the encoded target phone number regardless of the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of a keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the connection server (255), pauses for a short period of time for the connection server (255) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 7, the user device initiates the phone call. Alternatively, a connection server may be used to initiate phone calls both to the user device (or a separate user phone) and the target phone and then join/bridge the phone calls to connect the user to the target phone. For example, when the user selects the encoded target phone number, the selection of the target phone number is transmitted to the connection server with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the connection server. Alternatively, the content information can be formatted so that the selection is sent directly to the connection server.

When the connection server starts the phone calls, the encoded target phone number can also include alphabetic characters (and/or other characters). The connection server can decode the encoded target phone number to recover/retrieve the target phone number and other associated information, such as the identity of the media channel that is creditable for providing the encoded target phone number to user.

In one embodiment, an advertisement is presented to end users around the globe without geographical area limitations. For example, an advertiser may provide services and/or products to customers around the globe. The advertisement may be delivered to the worldwide users of the Internet.

In one embodiment, the intended audience of an advertisement is the population in a particular geographical area or people interested in a particular geographical area. For example, an advertiser may limit its service area within a geographical area, where the advertiser can provide services and/or products to the customers more effectively. For example, a business may better serve the customers within a convenient walking/driving distance to the site of the business. A business may limit the service area within a city, a county, a state, a country, or other types of regional areas. Further, a large business entity having offices around the world may want to attract customers in different geographical regions to different offices for better services.

In one embodiment, a target geographic area is specified for publicizing a phone number which can be used to reach an advertiser. The target geographic area information can be used to effectively reach potential customers and connect the customers to the corresponding phones of the advertisers.

For example, in one embodiment, the advertiser can specify a geographic service area corresponding to a phone number. The service area may be specified in terms of radius, city, region, state or national boundary, etc. The service area can be used to limit the delivery of the advertisement to customers seeking information in the corresponding geographic area. The service area can be used to stream information into a mobile device when the mobile device enters the service area, with or without explicit request from the user of the mobile device. The service area information can also be used to route the phone to the corresponding one of the offices of the advertiser, based on the location of the caller, if the advertiser has more than one office.

In one embodiment, an advertisement presented in a media channel is for a single advertiser. The end user selects an advertiser according to the advertisements presented on behalf of individual advertisers; and the connection server connects the end user and the selected advertiser according to the encoded target phone number individually publicized in the advertisement for the advertiser. When the user views the online advertisements, the selection of the advertiser is based on the online information.

In one embodiment, an advertisement is presented in a media channel for a group of advertisers, such as a group of mortgage brokers. The advertisement contains an encoded target phone number which is reachable to the group of mortgage brokers. When the encoded target phone number is selected or used, the selection of a particular advertiser is performed at the connection server.

For example, a toll-free number is published to advertise mortgage brokers in a particular geographic area. When a consumer dials the toll-free number, the call is routed to the highest bidding mortgage broker who is available in that market.

The connection server may select the target advertiser according to the bidding of the advertisers for the advertisement. The advertiser who places the highest bid is the winner for the call. Alternatively, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others.

Figure 8:
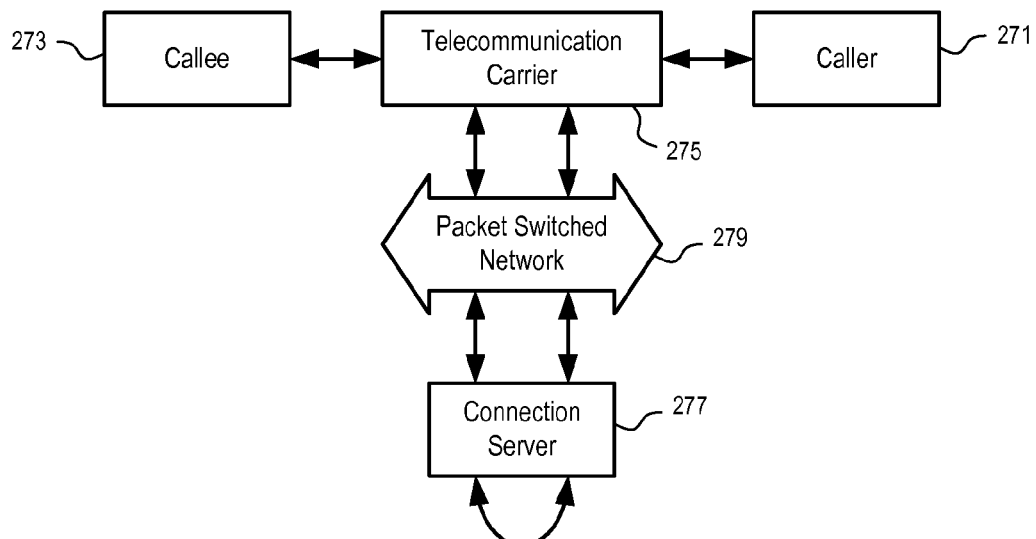
FIG. 8 shows a system including a connection server configured on a packet switched network according to one embodiment.

In one embodiment, a connection provider uses a connection server configured on a packet switched network to provide telephone connections between callers (e.g., customers) and callees (e.g., advertisers), as illustrated in FIG. 8. In FIG. 8, the connection server (277) receives and/or places telephone calls via the telecommunication carrier (275) over the packet switched network (279). The telecommunication carrier (275) further routes the telephone communications towards the caller (271) and the callee (273).

Since the telecommunication carrier (275) can route a call from a packet switched network to a variety of destinations (e.g., a traditional analog telephone set, a mobile phone, a cellular phone, a WiFi phone, a Bluetooth phone, a softphone running on a computer, etc.), the connection sever (277) can use one type of communication connection with the telephone carrier (275) to facilitate the communication connections with variety of devices used by the customers (e.g., callers and callees). Thus, the implementation of the connection server (277) can be simplified. In one embodiment, the connection server (277) can also place and/or receive direct VoIP calls to/from the caller (or callee).

For example, to make a voice connection in response to a click-to-call request, the connection server can place separate VoIP calls, via the telecommunication carrier (275), to the caller (271) (e.g., the requester of the click-to-call) and the callee (273) (e.g., the destination of the click-to-call request).

If the caller (271) (or the callee 273) is on a public switched telephone network (PSTN), the telecommunication carrier (275) bridges the packet switched the network and the public switched telephone network (PSTN). The telecommunication carrier (275) routes the call from the packet switched network (279) to the caller (271) (or the callee 273) on the circuit switched network. Thus, the caller (271) (or the callee 273) can use a telephone set to receive the call via a Plain Old Telephone Service (POTS). The connection server (277) joins the separate calls that are placed via the packet switched network (279) to connect the callee (273) and the caller (271).

In one embodiment, call signaling and media content may use different network paths. While call signaling is arranged to go through the packet switched network (279) and the connection server (277), the media stream does not have to go through the connection server (277). For example, when the calls are joined, the media content may be redirected to flow over the communication carrier (275) without going through the packet switched network (279) to the connection server (277) for improved performance and efficiency. The connection server (277) can release the control over the media stream to allow the media stream to flow through the shortest path, without going through the connection server, while maintaining control to the connection for the call by staying on the path for call signaling.

In another example, when the caller (271) initiates a call over a PSTN to the connection server (277), the telecommunication carrier (275) converts the call for the packet switched network (279) for the connection server (277).

In one embodiment, virtual softphones on the telecommunication carrier (275) are assigned to the caller (271) and the callee (273) for interfacing with the connection server (277) over the packet switched network (279). The virtual softphones encapsulates the devices and networks used by the caller (271) and callee (273) to access the connection server (277); and the telecommunication carrier (275) shields the connection server (277) from the implementation details of the user devices and networks used by the caller (271) and the callee (273). The connection server (277) calls (or receives calls from) and connects the virtual softphones on the telecommunication carrier (275) to connect the caller (271) and the callee (273).

In FIG. 8, the telephone connection between the telecommunication carrier (275) and the connection server (277) is facilitated via a packet switched network (279). Thus, the connection server (277) can operate efficiently in a digital domain. The connection server (277) interfaces with the telecommunication carrier (275) using one type of Internet Telephony systems (e.g., SIP-based Internet telephony).

Alternatively, a connection server may include some or all of the functionality of the telecommunication carrier (275). For example, the connection server may be configured to bridge a packet switched network and a circuit switched network. The connection server may support multiple, different types of Internet Telephony systems.

In one embodiment, the connection server (277) and the telecommunication carrier (275) are operated by different, separate entities. Alternatively, the connection server (277) and the telecommunication carrier (275) may be operated by the same entity. In another embodiment, the telecommunication carrier (275) includes a set of facilities operated by a number of separate entities.

In one embodiment, the caller (271) and/or the callee (273) may also place/receive calls via a packet switched network. The telecommunication carrier (275) may route the calls between the caller (271) and the callee (273) without using a PSTN. In one embodiment, caller (271) and/or the callee (273) may place calls to or receive calls from the connection server (277) via Internet.

Figure 9:
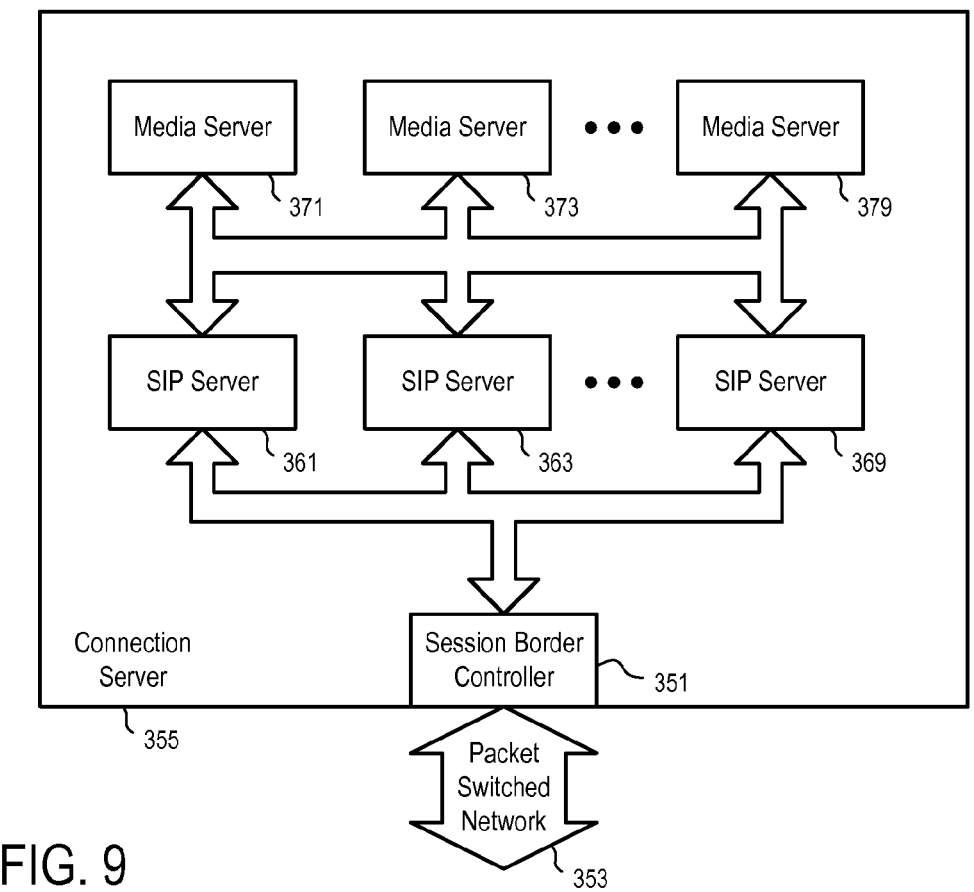
FIG. 9 shows a connection server according to one embodiment.

FIG. 9 shows a connection server according to one embodiment. In FIG. 9, the connection server (355) is configured to place and/or receive VoIP calls using Session Initiation Protocol (SIP). A session border controller (351) is used to interface with the packet switched network (353) and control the types of network traffic related to VoIP calls that might go into the connection server (355).

In one embodiment, the session border controller (351) is configured to control the signaling and media stream during the setting up, conducting and tearing down of VoIP calls to or from the connection server (355). In some embodiments, the session border controller (351) may pick up the call that comes to the session border controller (351), places a separate call from the session border controller (351), and joins the received call and the placed call to control both the signaling and media stream. In some embodiments, the session border controller (351) may perform signaling/encoding translation to allow the connection server (355) to process the VoIP calls in one standard, while receiving VoIP calls in a variety of standards (e.g., SIP, H.323, etc.). In one embodiment, the session border controller (351) is configured to perform one or more firewall functionalities, such as denial of service protection, call filtering, bandwidth management, etc.

In one embodiment, the session border controller (351) is configured to perform media releasing operation. When the session border controller (351) determines that the source and destination of a media stream is on the same side of the session border controller (351) (e.g., both the source and the destination of the media stream is outside the connection server 355), the session border controller (351) can release the hairpinning of the media stream and allow the media stream to flow without going through the session border controller (351).

In FIG. 9, a set of SIP servers (e.g., 361, 363, . . . , 369) are networked to the session border controller (351) to receive messages for incoming calls and to initiate outgoing calls. The session border controller (351) is configured to evenly distribute the calls for processing by the SIP servers.

For example, when an incoming message for the initiation of a call is received (e.g., a SIP INVITE message from the telecommunication carrier 275), the session border controller (351) may route it to a SIP server (e.g., 361) for processing. The INVITE message includes the phone number dialed by the caller and the contact information about the caller (e.g., the phone number of the caller 271 and/or the identity of the virtual SIP phone at the telecommunication carrier 275).

The SIP server may determine whether the phone number dialed by the caller (273) is sufficient to determine the phone number of the callee (e.g., 273). If the phone number of the callee (e.g., 273) can be determined from the phone number dialed by the caller (273) (e.g., via decoding the phone number dialed by the callee, or looking up the phone number of the callee from a table using the phone number dialed by the caller as a key), the SIP server can place a separate SIP call to the callee via the packet switched network (353) and then connect the caller and the callee. Alternatively, the SIP server can further route the SIP INVITE message (e.g., to the telecommunication carrier (275) to direct the call to the callee. For example, the SIP server may modify the INVITE message by replacing the destination with the determined phone number of the callee. Further, the SIP server can modify the INVITE message by removing the phone number of the caller (or replacing the phone number of the caller with a phone number of the connection server). In one embodiment, the modified INVITE message identifies the virtual softphone corresponding to the caller on the telecommunication carrier as the SIP phone initiated the call; thus, the virtual softphone corresponding to the callee on the telecommunication carrier can establish media connection with the virtual softphone corresponding to the caller on the telecommunication carrier directly. Alternatively, the modified INVITE message may identify a media server (371) (or a virtual softphone on SIP server) as the initiator for a separate call. The SIP server then connects the calls for the media stream.

In one embodiment, the caller is first connected to a media server (e.g., 371, 373, or 379). For example, the SIP server may forward the SIP INVITE message to one or more of the media servers for answering the call. When a media server (e.g., 371) answers the call, a prompt is played to the caller by the media server. The media server may include an Interactive Voice Response (IVR) system, or be connected to an IVR system, to obtain input from the caller.

For example, the media server may prompt the caller to enter the extension assigned to the callee, such that the phone number of the callee can be determined based on the phone number including the extension dialed by the caller. In some embodiments, the extension dialed by the caller is sufficient to determine the phone number of the callee. After the phone number of the callee is determined, the SIP server can further connect the call to the callee.

For example, the media server can send a message to the SIP server. The message identifies the call and the extension obtained from the caller. The SIP server then determines the callee's phone number based at least on the extension received from the media server and initiates a SIP call via the packet switched network (353) (e.g., by sending a SIP INVITE message to the telecommunication carrier 275, which further bridges the call to the callee 273). Then, the SIP server disconnects the media server from the call and reconnects the call to the callee.

For example, the SIP server can send a SIP BYE message to the media server to disconnect the media server from the call (e.g., by sending a "BYE" message to the media server for the call) and send a re-INVITE message towards the caller to connect the caller and the callee. Alternatively, the media server may send a SIP BYE message to the SIP server for the call; the BYE message may include the extension obtained from the caller; in response to the BYE message that contains the extension, the SIP server determines the phone number of the callee and further connects the caller to the callee.

In one embodiment, the SIP server can direct the caller and the callee to connect to each other for the media stream without having the media stream going through the session border controller (351) into the connection server (355). For example, the media stream can go through the telecommunication carrier (275) in FIG. 8 without going to the connection server (277) after the SIP server connects the caller and the callee.

However, the SIP server stays on the signaling path to monitor the progress and termination of the call. The SIP server can also break the connection between the caller and the callee, or force the media stream to come through the connection serve (355). For example, the SIP server may selectively conference a media server into the call to monitor and/or record the communication of the call between the caller and the callee. For example, the SIP server may reconnect the caller and the callee to separate media servers for interaction with an IVR system or a human operator to confirm a deal or transaction.

Similarly, the SIP server may initiate a callback to a caller via a SIP call over the packet switched network (353) for a connection to the caller. The SIP call may be bridged onto a circuit switched network (e.g., by a telecommunication carrier 275). The SIP server can then reconnect the call to a media server for sending a prompt to the caller before reconnect the call to the callee. Alternatively, the callback can be initiated from a media server; and the call signaling (e.g., the INVITE message from the media server) goes through the SIP server for call control. Alternatively, the SIP server sends out the INVITE message on behalf of the media server.

In one embodiment, the SIP servers (361, 363, . . . , 369) and media servers (371, 373, . . . , 379) are implemented on separate computers connected via a local area network (and/or intranet or Internet). Alternatively, at least the some of the servers can be implemented on a same computer. In one embodiment, the SIP servers and the media servers are also integrated with the session border controller (351) on a same data process system having multiple processors coupled with a data bus. In one embodiment, the SIP servers are coupled to the media servers via a network; and a SIP server may use any of the available media servers for interaction with the caller (or callee). Alternatively, a SIP server may be configured to use one or more of media servers that are not shared by other SIP server. For example, a SIP server may be implemented on a same data processing system with one or more media servers which are reserved for the SIP server.

In one embodiment, the connection server (355) may further include a database server (355) to storing records related to the calls, data mapping between the communication references assigned to the callees and the actual phone numbers of the callees, etc. In one embodiment, contact mapping are cached in the local memory (e.g., RAM) of the servers for improved performance; and the cached mapping is updated when the database is updated.

Figures 10, 11:
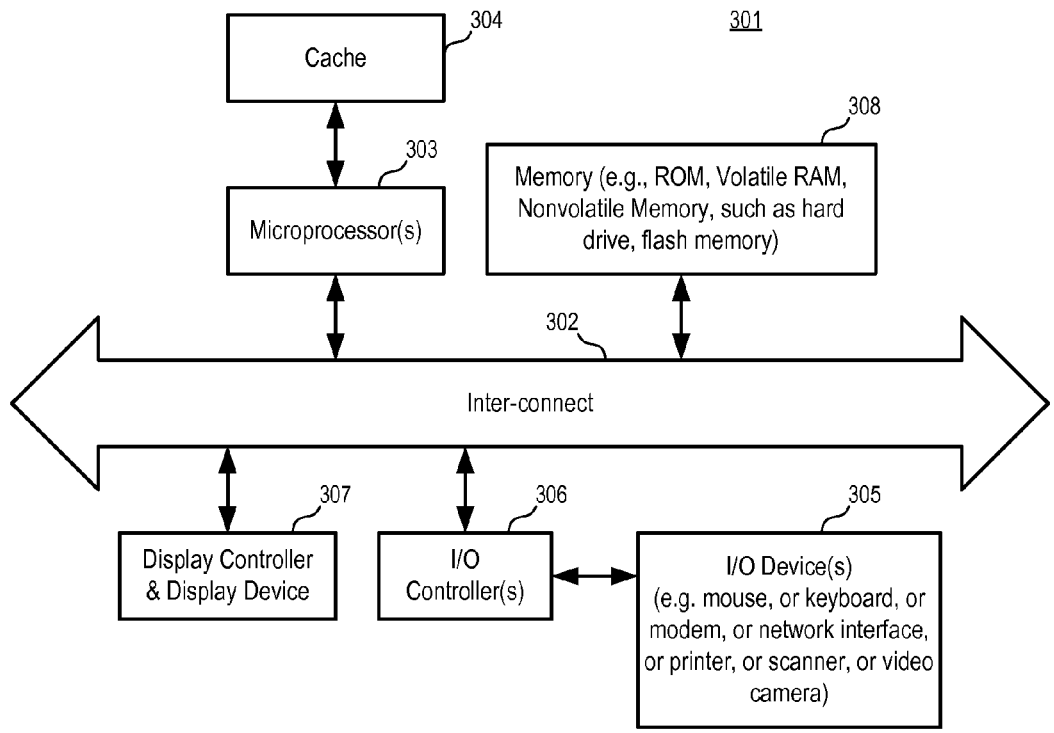
FIG. 10 shows a block diagram example of a data processing system which may be used in various embodiments.
FIG. 11 shows a user interface to arrange a callback to connect a caller to a callee for real time communications according to one embodiment.

FIG. 10 shows a block diagram example of a data processing system which may be used in various embodiments. While FIG. 10 illustrates various components of a computer system, it is not intended to represent any particular architecture or manner of interconnecting the components. Other systems that have fewer or more components may also be used.

In FIG. 10, the communication device (301) is a form of a data processing system. The system (301) includes an inter-connect (302) (e.g., bus and system core logic), which interconnects a microprocessor(s) (303) and memory (308). The microprocessor (303) is coupled to cache memory (304) in the example of FIG. 10.

The inter-connect (302) interconnects the microprocessor(s) (303) and the memory (308) together and also interconnects them to a display controller and display device (307) and to peripheral devices such as input/output (I/O) devices (305) through an input/output controller(s) (306). Typical I/O devices include mice, keyboards, modems, network interfaces, printers, scanners, video cameras and other devices which are well known in the art.

The inter-connect (302) may include one or more buses connected to one another through various bridges, controllers and/or adapters. In one embodiment the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a server data processing system as illustrated in FIG. 10 is used as one of the communication server(s), connection server(s), database server(s), media server(s), controller(s), router(s), gateway(s), etc. In some embodiments, one or more servers of the system can be replaced with the service of a peer to peer network of a plurality of data processing systems, or a network of distributed computing system. The peer to peer network, or a distributed computing system, can be collectively viewed as a server data processing system.

A user terminal as a client system can be a data processing system similar to the system of FIG. 10. A client system can be in the form of a PDA, a cellular phone, a notebook computer or a personal desktop computer. For example, the I/O devices of the user device may include a USB phone, a Bluetooth wireless phone, or one or more speakers or headphones with one or microphones for the implementation of a software based phone.

In one embodiment, a user devices/phones support one or more real time communication capabilities, such as VoIP using Session Initiation Protocol (SIP) which may support video and instant-messaging applications, IP phone, regular phone over VoIP service, Bluetooth wireless phone, USB phone, software based phone, and other forms of IP telephony. Other types of traditional communication client(s) may be used in some embodiments.

FIG. 11 shows a user interface to arrange a callback to connect a caller to a callee for real time communications according to one embodiment. For example, when the user selects a click to call reference, the user interface as illustrated in FIG. 11 can be presented.

In FIG. 11, the interface allows the user to specify a time window (321) in which the user is available for real time communications with the callee (e.g., advertiser, advisor, seller, etc.). The user can provide the one or more phone numbers of the user in the entry boxes (e.g., 323, 329). The user can select the control (328) to request further fields for more callback references. In other embodiments, the user can also provide other types of references for a real time communication, such as a member name, a user identifier, an account number, a screen name, a telephonic reference such as a SIP URI, a VoIP user ID, an instant messaging user identifier, etc. In one embodiment, the user can specified a number of callback references of different types, such as phone numbers with or without extension, SIP URIs, instant messaging user identifiers, etc.

In one embodiment, if the user has already signed in, the callback references (e.g., telephone number, user ID, etc.) can be obtained automatically from the user account and filled in the entry boxes (323 and 329) for confirmation by the user. In one embodiment, the user terminal (e.g., a softphone, a cellular phone, etc.) can automatically determine the one or more callback references of the user; and the automatically determined callback reference can be used to pre-fill the entry boxes (323 and 329) for confirmation by the user. Alternatively, when the callback references can be determined via the automated process, the system may initiate the connection process without displaying the interface as illustrated in FIG. 11.

In one embodiment, when the callee is available for real time communications with the user, the connection provider can call the phone number of the user to provide a connection between the user and the callee.

In one embodiment, when the advertiser is available to talk to the customer, the connection server can connect to the customer via multiple concurrent callbacks to the telephonic references of the customer. Thus, the customer can take the callback to talk to the advertiser via any of the multiple telephonic apparatuses of the customer. The system may connect the first answered callback to the advertiser and drop the other callbacks, or allow the customer to pick up more than one callback for a conference call.

In one embodiment, the connection server can initiate multiple concurrent callbacks to the customer and multiple concurrent calls to the advertiser to connect the customer and the advertiser. In one embodiment, the connection server receives a call from the customer and initiates concurrent calls to the advertiser to connect the customer to the advertiser. In one embodiment, the connection server establishes a connection with the advertiser and then initiates multiple concurrent callbacks to the customer to connect the customer to the advertiser.

In one embodiment, multiple concurrent calls are initiated from the user terminal of the customer or from the user terminal of the advertiser. The multiple concurrent calls may include one or more calls for peer to peer connections without going through a connection server.

In one embodiment, multiple calls can be initiated in the user terminal of the customer, or the user terminal of the entity of the listing. For example, when a link or icon button in an advertisement displayed on the softphone (or a mobile phone or smart) of the customer is selected, the softphone can be instructed to initiate multiple concurrent calls to the advertiser based on the multiple references embedded in the link or the icon button. In another example, the advertiser is provided with a message to call back the customer; and the message can include a link or icon button to cause the phone of the advertiser to initiate multiple concurrent callbacks to the customer. In one embodiment, the phone is instructed to make connection with the first answered one of the concurrently placed calls. Alternatively, the phone is instructed to establish a conference for all answered calls.

In one embodiment, a reference to the user request is provided to the advertiser/advisor to allow the advertiser/advisor to initiate the connection with the user for real time communications. For example, the system may send a message to the advertiser/advisor, including the reference to the user, to inform the advertiser/advisor that the user is interested in a callback within the time window specified by the user. The message can be sent via an email, an instant message, an SMS text message, a voice mail, a phone call, etc.

In FIG. 11, the user may further optionally provide a comment in the text field (325) to get the attention of the advertiser/advisor. In one embodiment, the comment provided in the text field (325) is sent to the callee (e.g., advertiser, advisor or seller) with the notification of the request. For example, when the callee is notified via a telephonic connection, the comment can be provided via a text to speech module. For example, when the callee is notified via a visual message, the comment can be included as text.

In FIG. 11, a visual interface is provided to a user to specify a callback number and a time window. Alternatively, the user may call a phone number assigned to the seller to specify the callback numbers and the time window and to record a voice message for the seller. The phone number can be a phone number local to the user, a toll free number (e.g., 1-800-Call-Bob), a telephone number with an extension, a SIP URI, an instant messaging user identifier, a VoIP user identifier, a user identifier of a peer to peer voice communication network, a member name, a click-to-call reference, a reference to a phone number, an Internet address for a voice connection, etc. When the phone number assigned to the seller is called by the user, the call is connected to a connection provider which prompts the user to specify a callback number, a time window, a voice message, if the seller is not immediately available to communicate with the user. In one embodiment, the connection server automatically determines the number of the user (e.g., via an automatic number identification (ANI) service) and ask the user to confirm the use of the number as the callback number. Alternatively, the callback number can be determined from the preference setting of the user, after the user is authenticated over the phone connection.

In one embodiment, a social network is used to establish a measure of trustworthiness between people, such as advertisers and their customers, service providers and their customers, sellers and their customers, etc.

In one embodiment, a social network is used to establish trust between service providers/sellers and customers/buyers. The degrees of separation in a social network can be used as a measurement of trustworthiness in searching for service providers/sellers. For example, in a marketplace of human-expertise a social network allows a customer to search for service providers (e.g., therapists) who are within a number of degrees of separation from the customer in the social network. For example, the customer may limit the search of therapists to those who are known to someone the customer knows (e.g., within two degrees of separation in the social network).

In one embodiment, the social network is used to verify credentials of people involved in a marketplace, such as a human-expertise marketplace. For example, the social network can be used to verify credentials of a seller/service provider/advertiser and thus to increase the trust in the person the customer is looking to talk to. For instance, a customer may see that a therapist went to a college for her degree; and the social network can display testimonials from her professors and classmates that she indeed went to that college and indeed is high quality.

In one embodiment, a social network is integrated with a service market place in which services are provided via a connection for real time communications, such as a telephonic connection, an instant messaging connection for text, voice and/or video communications, etc.

In one embodiment, a social network is integrated with an advertisement system which allows customers to assess the trustworthiness of the advertisers.

Figure 12:
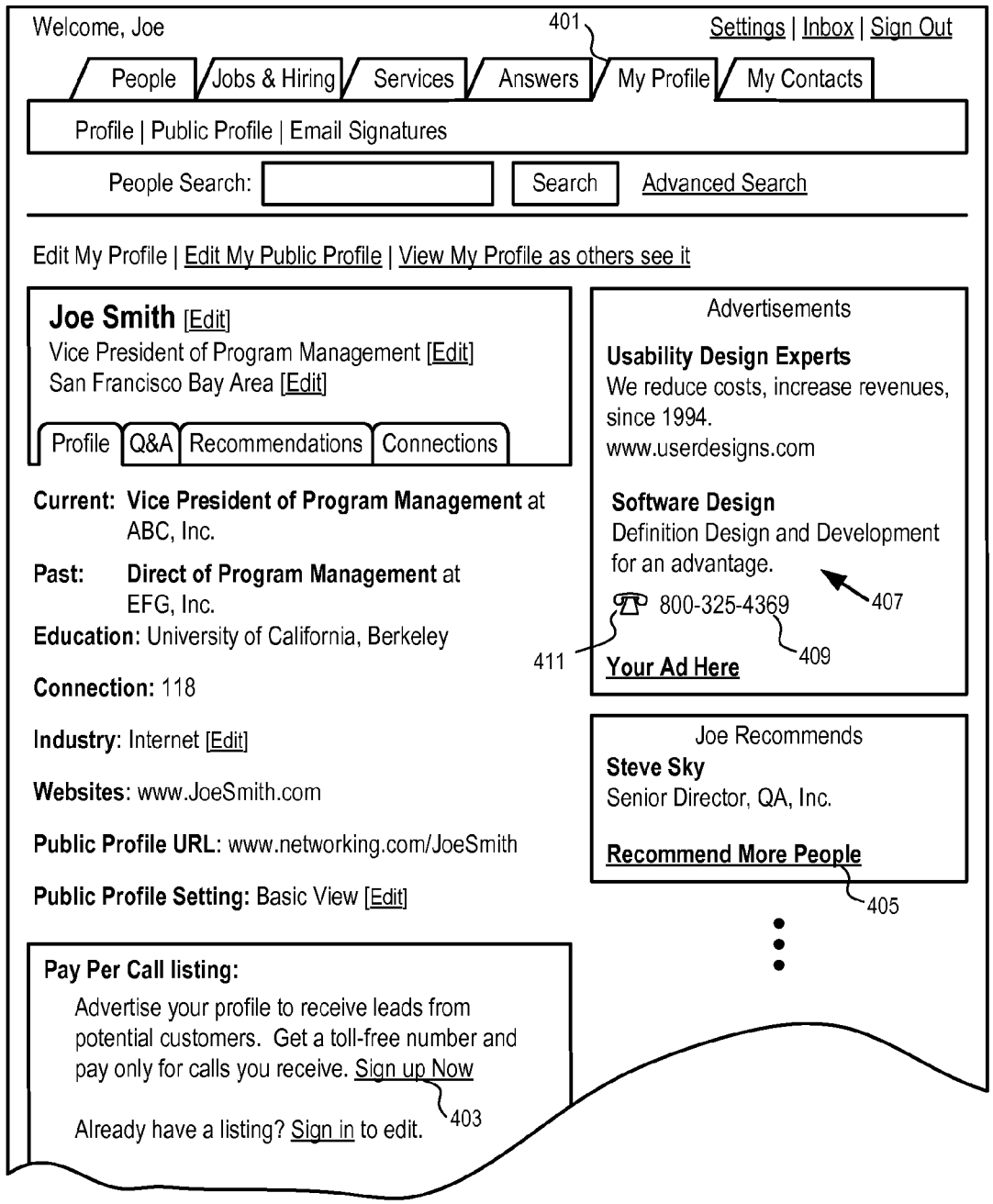
FIG. 12 shows an example of a user interface to integrate a social network and an advertisement network.

FIG. 12 shows an example of a user interface to integrate a social network and an advertisement network. In FIG. 12, a user (e.g., Joe Smith) of the social network can select the "My Profile" tab (401) to view/edit the member profile of the user.

In one embodiment, the social network includes a database that contains data representing the relations between a set of members. In a social network, a member may be represented by a node; and a direct relation between two members is represented by a connection. After the direct relations between members are specified, the database can be used to determine the relations between members that are indirectly connected. For example, the member may identify a friend's friend via the service of the database.

In one embodiment, the number of connections along the shortest path in the social network between two members is considered the degree of separation between the two members. There may be more than one shortest path between the two members.

In one embodiment, the database of the social network further includes information about the members, which are considered the profile data of the members.

For example, a member may edit his/her profile data via the user interface illustrated in FIG. 12. The profile data can include the name of the member, the location of the member, the current and/or past job title of the member, the industry the member is specialized in, the website of the member, the education experiences of the member, etc.

In one embodiment, at least part of the profile data is public; and the public data is visible to other members and/or non-members. In one embodiment, the member may specify a setting to selectively classify certain information as private profile data; and the access to the private profile data is limited according to a set of rules.

In FIG. 12, the user interface also allows the member to sign up (403) as advertisers to promote their businesses and/or services. In one embodiment, the system presents advertisements for the advertiser; and the advertiser is charged an advertisement fee when a customer's incoming call is connected to the advertiser via the advertisement. In one embodiment, the advertiser is not charged an advertisement fee if the presentation of the advertisement does not cause a customer to call the advertiser. Alternatively or in combination, the connection provider charges a commission fee when the advertiser sells services and/or products over the communication connection (e.g., telephone connection) provided by the connection provider.

When an advertiser is identifiable as a member of the social network, the social network can be used to provide information about the advertiser and/or to establish the trust between a potential customer and the social network. The potential customer may use the social network to find the connections of the advertiser with other peoples, to find the recommendations, feedback, comments made about the advertiser by the others who the customer can trust, etc. Further, if the customer is also a member of the social network, the customer may determine the social distance from the advertiser and find someone them may know in common for an opinion about the advertiser.

In FIG. 12, the user interface includes a link (405) which allows the member to recommend people who the member knows. In one embodiment, the comments, feedback, ratings of the prior customers are weighted or labeled or sorted based on the social distances between the customers and the advertiser/seller/service provider. Using the social network, a potential customer can find a personalized view of the information based on the social relations among the potential customer, the advertiser/seller/service provider and the prior customers who provided the comments, ratings, feedback, recommendations, etc. For example, the trustworthiness of the comments, ratings, feedback, and recommendations can be rated, sorted and presented according to the social network structure (e.g., social distances, connections of a member of the social network, recommendations made by a member of the social network, etc.). For example, a member may assign a value for a trustworthiness indicator to members who are directly connected to the member in the social network structure; and using the social network the system can evaluate a value for the trustworthiness for indirectly connected members. Separate indicates may be used for feedback, recommendations, etc. In one embodiment, the social network system collects information for the automated evaluation of a value for a trustworthiness indicator of a friend of member of the social network structure, which can be further used to compute the value for the trustworthiness indicator for indirectly connected members. For example, a member may rate the trustworthiness of feedbacks, recommendations, ratings, etc., of other members. In one embodiment, the social network system uses the trustworthiness indicator to sort information such as feedbacks, recommendations and/or to select advertisements for presentation. The system may or may not display the value of the trustworthiness indicator to the users.

In FIG. 12, advertisements are delivered to the member based on the profile information the social network has about the member and/or other information in one embodiment. For example, the advertisement (407) includes a phone number (409) and an icon (411), which can be used to request a connection provide to provide a telephone connection between the advertiser and the member.

In one embodiment, the phone number (409) is assigned to the advertisement (407) by a connection provide for tracking the response to the advertisement. When the phone number (409) is called by a customer, the call is connected to the connection provider, which determines the phone number of the advertiser based on the phone number (409) that is dialed to reach the connection provider. The connection provider then further connects the call to the advertiser. In one embodiment, the advertiser is charged an advertisement fee per the connection of the customer call to the advertiser. Alternatively or in combination, the advertiser may be charged based on the number of presentations of the advertisement made on behalf of the advertiser and/or based on a subscription agreement.

In one embodiment, when the icon (411) is selected, the connection provider calls back the member and calls the advertiser separately to connect the member and the advertiser. In one embodiment, when the icon (411) is selected, a VoIP application is used to connect the member to the advertiser via the connection provider. In another embodiment, the VoIP application tracks the calls made through the advertisements to bill the advertiser accordingly. In one embodiment, when the icon (411) is selected, a VoIP application is used to call the phone number (409) to request the connection provider for a connection to the advertiser.

Figure 13:
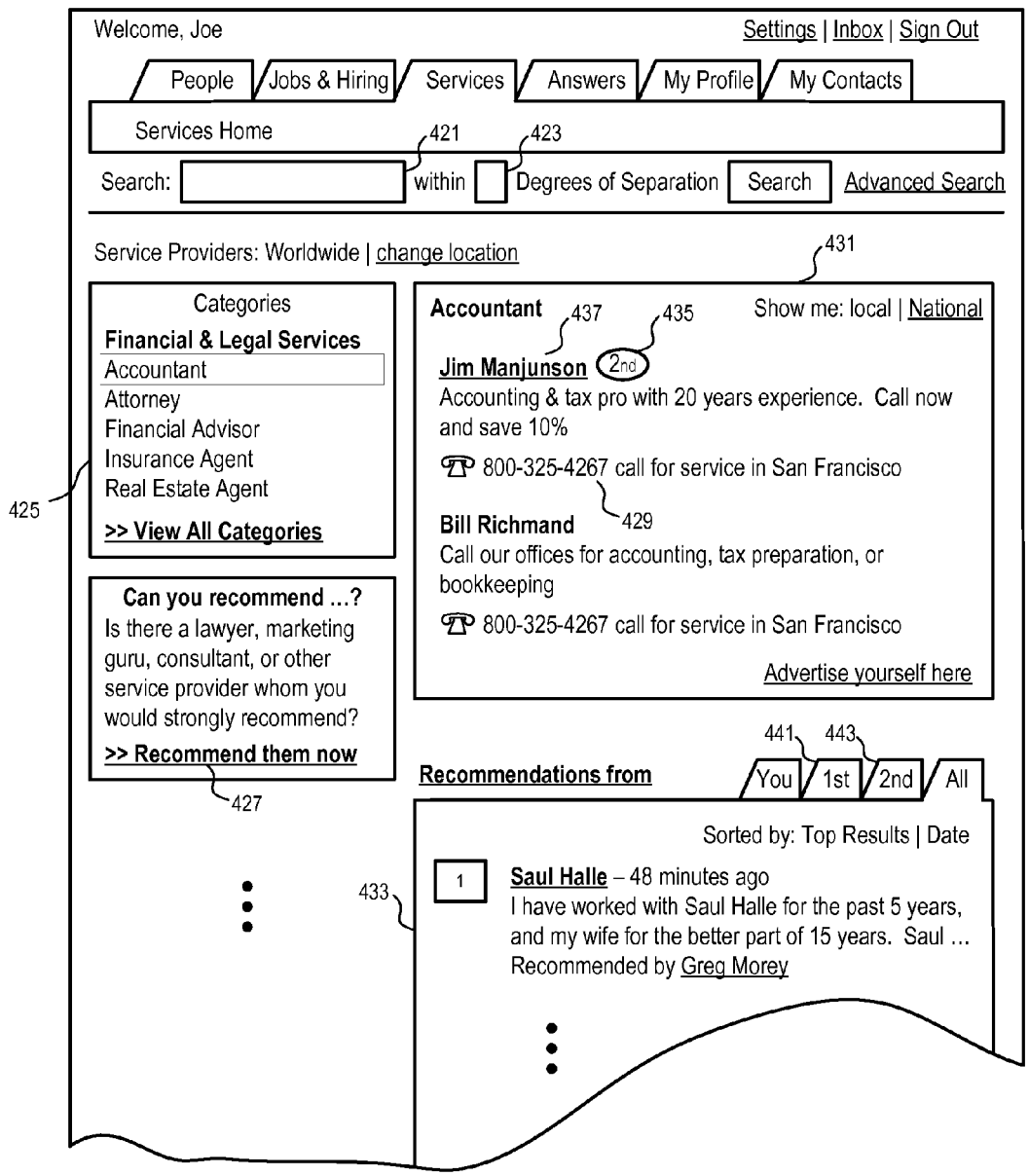
FIG. 13 illustrates an interface which can be used by a member of a social network to locate services providers according to one embodiment.

FIG. 13 illustrates an interface which can be used by a member of a social network to locate services providers according to one embodiment. In FIG. 13, the entry box (421) can be used to specify a search criterion (e.g., one or more keywords); the entry box (423) can be optionally used to specify a criterion for degrees of separation in the social network. For example, the member may search for an accountant who is within 2 degrees of separations from the member in the social network.

In FIG. 13, a member may also browse through a directory structure (e.g., categories of services) to locate a service provider. For example, in response to the member selecting the "accountant" category, advertisements (431) and recommendations (433) are displayed. The advertisements (431) can be selected based on matching the location of the service providers and the location of the member, the bid prices of the advertisements, etc. In one embodiment, advertisers can specify the bid prices for the advertisement fees which are charged when the customer calls the phone number (e.g., 429) to reach the advertiser.

In one embodiment, when the advertiser is also a member of the social network, the advertisement includes an indication (435) of social distance between the advertiser and the user of the interface. Further, in one embodiment, a link (437) to the profile of the advertiser is provided to allow the customer to research the advertiser before calling the advertiser.

In FIG. 13, the recommendations from the members of the social network for the service providers in the selected category (e.g., accountant) are presented based on the social distances to those who make the recommendations. For example, in FIG. 13, the member can select the tab (441) to view the accountants recommended by the friends of the member and select the tab (443) to view the accountants recommended by the friends of friends of the member.

In FIG. 13, a link (427) can be selected to request a user interface for making a recommendation for a service provider. In one embodiment, the system allows a member to recommend any service providers. Alternatively, a member may be limited to make recommendations for service providers who have direct connection with the member, who have provided services to the member via the system, and/or who are within a certain distance from the member in the social network.

FIG. 14 illustrates a system to connect customers to experts according to one embodiment. In FIG. 14, a member of the social network can post a question that can be answered by other members of the social network. In one embodiment, the question is posted in a category (e.g., a business area or technology field) for answers from members who are specialized in the category (e.g., due to their past experiences, education, or current job positions).

In FIG. 14, the user (Joe) is viewing a question (451) which is posted by another member (Lui Magarian), whose profile is summarized in a banner (453). The banner (453) can be selected to view further details about the member (Lui Magarian) who asked the question. For example, a link (455) can be selected to see other questions asked by the member (Lui Magarian)

In FIG. 14, the user (Joe) can select the icon (457) to provide an answer (457) or the icon (459) to suggest an expert to answer the question (451). Alternatively, the user (Joe) may chose to reply to question privately, or forward the question to an expert the user (Joe) knows.

In FIG. 14, the user (Joe) can also see a number of existing answers to the question posted by other members (e.g., Rob Berman, Furqn Naz). In FIG. 14, banners (461, 463) are displayed to show the brief summaries of the members who provided the existing answers.

For example, the banner (441) shows that Rob Berman, who is a consultant in corporate communications, strategic planning and business development, has provided a number of best answers categories such as "starting up", "accounting", etc.

In one embodiment, the answers can be rated by the member who posted the question (and/or other members who reviewed the answers). Thus, the quality of the answers provided by the experts can be rated and ranked. Such feedback provides an evidence of credentials of the experts in providing advices in certain fields.

In FIG. 14, the icon (465) also shows that the expert is currently available to provide advices over a real time communication connection. In one embodiment, when the icon (465) is selected, the user (Joe) will be called back for a connection with the expert (Rob Berman) who charges a customer $30 for a session that is up to 15 minutes for advices provided over the connection. In one embodiment, when the icon (465) is selected, a VoIP application program is used to call the expert (Rob Berman) for a connection for instant messaging in text, voice and/or video. In one embodiment, when the icon (465) is selected, an application program is used to dial the phone number of the expert (Rob Berman), or a phone number of the connection provider which is temporarily assigned to the advertisement of the expert (Rob Berman). In one embodiment, a phone number of the connection provider (with or without extension) is assigned to the expert (Rob Berman) and displayed in the banner (461).

In one embodiment, the connection provider tracks the calls and/or the duration of the communications to bill the customer and compensate the expert. In one embodiment, the connection provider tracks the calls through being in the path of the communication connection (or in the path of the call for the communication connection). In one embodiment, the connection provider uses the VoIP client application program to track the calls and/or duration.

In FIG. 14, the icon (467) indicates that the social distance between the user (Joe) and the expert (Rob Berman) in the social network. Thus, the banner (461) not only identifies the member who provided the answer, but also provides an advertisement for the expert. In one embodiment, the expert is charged an advertisement fee when a customer is connected to the expert through the advertisement. The advertisement fee may be a fixed, flat fee, or a fee based on a bid price of the advertiser, such as a fixed bid or a maximum bid. Alternatively or in combination, the expert may be charged a commission fee when the customer makes a purchase from the expert over the communication connection. The commission fee may be a fixed, flat fee, or a percentage of the customer spending. In one embodiment, the expert may charge the customer a fixed or flat fee for a communication session which is independent of the actual duration of the communication session (which may have a predetermined limit on the maximum duration, such as $30 for a session up to 30 minutes). Alternatively, the expert may charge the customer on an ongoing basis based on a rate (e.g., $2 per minute or $50 per hour).

FIG. 15 illustrates an example of providing advertisements via a social network according to one embodiment. In FIG. 15, a user (Lisa) is viewing the profile of a member within a sub-network that is accessible to user. For example, the user can view the direct contacts of the user within the social network.

In FIG. 15, a profile of a member (Joe Smith) is displayed. The icon (471) indicates that the user (Lisa) has a direct connection with the member (Joe Smith). The icon (473) indicates that the member (Joe Smith) is also an expert whose services are being advertised by the system.

In one embodiment, the icon (473) includes an indication of current availability of the expert (Joe Smith) for real time communications. When the member is not currently available, the appearance of the icon (473) can be changed to indicate that the user may request an appointment with the expert (Joe Smith) for a future connection, or request the system to send a notification to the expert.

In FIG. 15, when the user (Lisa) selects the icon (473), a connection provider connects the user (Lisa) and the expert (Joe Smith). The connection provider also charges the user (Lisa) on behalf of the expert (Joe Smith).

In one embodiment, the user can view at least the public profile of any member of the social network. For example, the social network can make the public profile of its members available to the public. When the member has a listing, the public profile can also show the listing on behalf of the member and/or the communication references to reach the member via a connection provider. The communication references can be a traditional telephone number with or without extension, a session initiation protocol (SIP) uniform resource identifier (URI), a VoIP user identifier, a member ID, etc.

In FIG. 15, targeted pay per call advertisements (475) can be presented to the user based on the profile data of the user (Lisa) and/or the profile data of the member (Joe Smith). When the advertisers of the advertisements are members of the social network, information based on the social network can be presented to show the trustworthiness of the advertisers. Banners (477 and 479) show the recommendations made by the member (Joe Smith) and the connections to common friends of the user (Lisa) and the member (Joe Smith). A customer may judge the trustworthiness of an advertiser via the recommendations of other persons made by the advertiser and the people associated with the advertiser.

Figure 16:
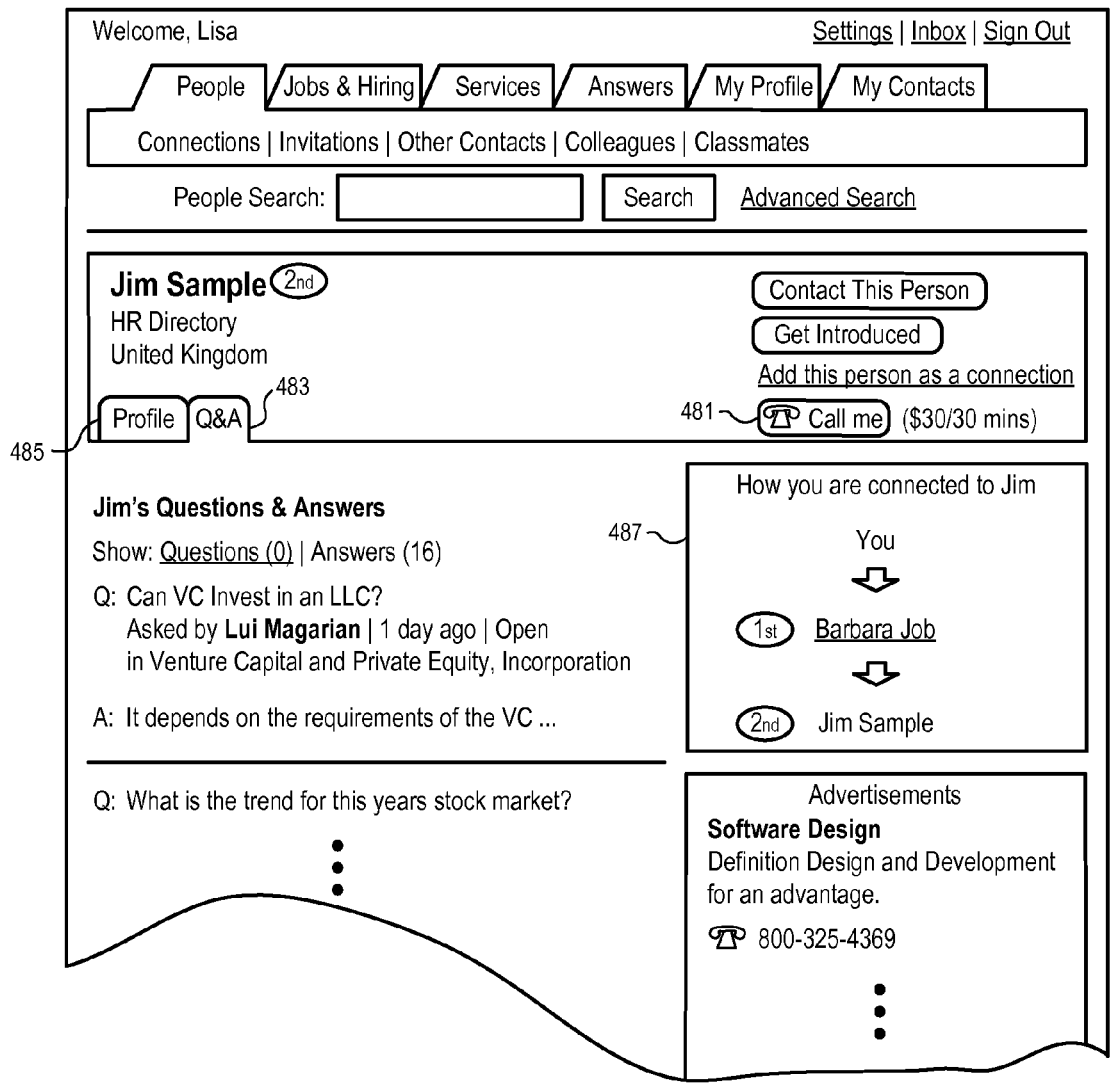
FIG. 16 illustrates an example of presenting an advertiser via a social network according to one embodiment.

FIG. 16 illustrates an example of presenting an advertiser via a social network according to one embodiment. In FIG. 16, a communication reference, such as a call button (481), is presented with a brief summary of the profile of the advertiser, which may be an expert, advisor, seller, entertainer, information provider, consultant, etc. Alternatively or in combination, a toll free telephone number or local telephone number may be presented with the brief summary. In one embodiment, the communication reference is assigned to the advertiser to be published as the contact information of the advertiser. The connection provider is between the path of a communication connection, or a call for the communication connection, between a caller and the advertiser to provide services such as filtering out callers who are not serious, blocking calls that are in the callable hours of the advertiser, processing payments for the advertiser, etc.

In FIG. 16, the tab (483) can be selected to view the questions asked by the advertiser and the answers provided by the advertiser, which provides an evidence of the competence of the advertiser as an expert in certain areas.

In FIG. 16, the tab (483) can be selected to view more detailed profile data of the advertiser, which may include the current employer, job title, field of business, technology, industry, education, credentials, recommendations, ratings, customer feedbacks, etc.

In FIG. 16, the banner (487) shows how the user (Lisa) is connected to the advertiser (Jim Sample). For example, the user (Lisa) is connected to the advertiser (Jim Sample) in the social network via one common friend (Barbara Job). Thus, the user (Lisa) may ask the common friend (Barbara Job) for information about the advertiser (Jim Sample). For example, the user (Lisa) may trust the advertiser (Jim Sample) based on the direct connection between the advertiser (Jim Sample) and the friend (Barbara Job) of the user (Lisa).

In one embodiment, members of a social network may indicate the areas of interest for which they might receive advertisements. In one embodiment, the advertisers may reward the members for real communications over connections provided by the connection providers. In one embodiment, the advertisers may use the social distance and/or other information from the social network to selectively target the delivery of advertisements and/or select the audiences for their advertisement pitches. Both the advertisers and the customers can use the social network to judge the trustworthiness of the other party.

In one embodiment, an advertiser can target pay per call advertisements to members of a social network based on the accessible profile data of the members. The advertiser is charged an advertisement fee when the member calls the advertiser via the connection provider.

In one embodiment, the social network can be used to facilitate real time communications between indirectly connected members. In one embodiment, a member of the social network may be allowed to browse the network to view profiles of other members who are within a threshold distance to the member in the social network (e.g., within 3 degrees of separation). In one embodiment, a member of the social network may also be allowed to browse the network to view a limited portion of profile data of other members who are more than the threshold distance to the member in the social network (e.g., a portion of the profile without names of other members who are beyond 3 degrees of separation from the member). Further, the public profile of the members can be published for access by non-members in one embodiment.

In one embodiment, a member of the social network can view the contact information of direct friends who are directly connected to the member in the social network (e.g., the access of contact information is limited to members within one degrees of separate). The member may use the social network to explore indirectly connected members (e.g., a friend of a friend) and request introductions or invitations to connect.

In one embodiment, the social network provides communication references which can be used to request a connection provider to provide a connection between two indirectly connected members for real time communications (e.g., telephone connections, instant messaging connections for text, voice and/or video chat, etc.). The connection provider provides the connection without reveal one member's contact information to another. In one embodiment, the connection provider can further provide the connection in accordance with a number of preferences of the callee of the connection. For example, the button (481) can be provided in the profile page of Jim Sample in FIG. 16 to allow the member (Lisa) to request a telephone connection to Jim Sample through the connection provider. In one embodiment, the button (481) is not specific for an advertisement; and the button (481) is designed to facilitate the communications between members who are indirectly connected in the social network.

In one embodiment, a member can limit who may request the connection based on a social network preference setting. For example, one member may allow the real time communication connections for members who are within two or three degrees of separation from the member in the social network. For example, one member may limit the real time communication connections to members who are connected to the member through a particular set of friends.

In one embodiment, a member may set a price for receiving a call for real time communication connections. For example, the member may specify a flat fee for accepting a call for a telephone conversation connected by the connection provider via the social network, with or without a limit on the length of the communication session. For example, the member may specify a per minute fee for accepting a call for a telephone conversation connected by the connection provider via the social network. In one embodiment, the member may set different prices based on one or more social network characteristics, such as the social distance to the caller, being connected in the social network via a particular friend of the member, etc. In one embodiment, the prices are specified prior to the request from the caller. In another embodiment, a price can be specified by the callee after both the caller and callee are connected to the connection provider but before the connection provider bridges the connections to connect the caller and the callee. In one embodiment, the connection provider may require that the prices are above a minimum price; and the system charges a percentage of the fees collected on behave of the callee as a commission fee. Alternatively, the communication references can be provided as a feature accessible to members who pay a subscription fee.

In one embodiment, a member can set a schedule to specify callable hours during which the member is willing to accept the calls for real time communication connections. The connection provider blocks requests for real time communication connections outside the callable hours.

In one embodiment, the connection provider assigns a phone number and/or a call button to a callee. When the phone number is dialed, or the call button is selected, the caller is connected to the connection provider before the caller is further connected to the callee. To connect the caller to the callee without revealing the contact information of the callee, the connection provider makes a separate connection to the callee and then bridges the connections to facilitate real time communications. In one embodiment, the connection provider also performs format and/or language translation to bridge the connections. For example, the connection provider can translate the text input received from one member into voice output to the other member and translate the voice input received from one member into text output to the other member. For example, the connection provider can translate voice or text input in one language received from one member into text and/or voice in another language for another member.

In another embodiment, the connection provider provides a VoIP client application to implement the preferences of the callee. For example, when a call button associated with a VoIP client application is selected, the VoIP client application is executed to initial a request in accordance of the callable schedule of the callee, the price of the callee, etc. In one embodiment, the VoIP client applications use peer to peer communications to facilitate the establishment of the communication connection.

In one embodiment, the communications references, such as a phone number, a SIP URI, a VoIP user identifier, a call button, etc., are associated with the member of the social network for requesting a communication connection with the member by someone who does not have direct contact information of the member. When the profile data of the member is presented, or when the member is presented as part of the social network, the communication references can be presented also to allow the user to request a connection with the member for real time communications. In one embodiment, the caller and callee may also provide indication through the connection for real time communications to make a direct connection in the social network between the caller and the callee. For example, the callee and/or caller may press "#00" on the phone to request a direct connection in the social network.

In one embodiment, the communications references, such as a phone number, a SIP URI, a VoIP user identifier, a call button, etc., are associated with listings of the members. The listings are advertised for the members when appropriate. The listing may be a pay per call advertisement for selling a product or service. The listing may be a listing for selling services over real time communications provided by the connection provider.

In one embodiment, the communication reference is embedded in an advertisement or a profile page to represent an address or identifier of the connection provider in a telecommunication system. When a call to the reference is made via the telecommunication system for a real time communication session, the call is connected to the connection provider. The connections provider may associate different communication references with different members, advertisers and/or advertisements so that the member/advertiser can be identified via the communication reference used to call the connection provider. After identifying the contact information of the advertiser based on the communication reference used to call the connection provider, the connection provider can further forward, bridge, conference or connect the call to the member/advertiser.

The connection provider can thus track the connections for real time communications with the advertiser, made via the communication reference embedded in the advertisement that is presented in the social network environment. The connections provided by the connection provider can be considered as communication leads provided to the advertiser via the advertisement; and the advertiser can be charged based on the delivery of leads to real time communications with customers.

In one embodiment, advertisers may specify bid prices for the communication leads received; and the presentation of the advertisement and the connection of calls can be prioritized based on the bid prices of the advertisers. In one embodiment, the advertisers may specify the rules or limits for the bid prices to allow the system to automatically determine the actual bid prices for the advertisers based on the bids of their competitors.

Examples of calls for a session for real time communications include but not limited to telephone calls made via a circuit switched network, a packet switched network, or a combination of circuit switched networks and packet switched networks, calls for a text-based chat sessions, calls for instant messaging sessions which may support communications in text, voice, and/or video, calls for an application sharing session such as common whiteboarding, screen sharing, file sharing, calls for teleporting to a meeting location in the virtual world, etc.

In some embodiments, the connection provider can also provide a channel for non-real-time communications between an advertiser and a customer, in addition to the real time communication connection, or as an alternative to the real time communication connection. In one embodiment, the connection provider can provide multiple concurrent connections for communications in multiple types of media or formats.

In one embodiment, a real time communication between two persons includes one person providing information and the other person receiving information substantially in the same time as the person providing the information, as if the two persons were in a face to face communication. Examples of communication media that support real time communications between two persons include telephone connections, instant messaging connections, etc. Alternatively, a communication from one person may be stored on a communication system until the other person is ready to obtain it, such as an email communication.

In one embodiment, call buttons are provided to call friends in a social network. In one embodiment, the call buttons are dynamically generated in a social network environment based on profile data, social connections, and preferences of members in the social network. For example, a call button can be dynamically generated and presented in the profile page of a friend of the member when the profile page of the friend is presented to the member. For example, call buttons can be dynamically generated and presented to a member when a list of friends of the member (or friends of the friends of the member) is presented to the member in a web page.

In another embodiment, a call button is assigned to a member of a social network to dynamically identify the friends of the member in the social network and to request telephonic connections to the dynamically identified friends. The call button assigned to the member may be placed outside the social network. For example, the call button may be placed in the desktop environment of the member, or in a toolbar of an application program running for the member, such as a web browser, a word processing application, a spreadsheet application, etc. In one embodiment, the user of the call button is to be authenticated to be a member of the social network before being allowed to use the call button. The call button is associated with the member once the member is authenticated. The authentication may be configured to expire after a predetermined period of time, or after the member logs out of the social network.

Figure 17:
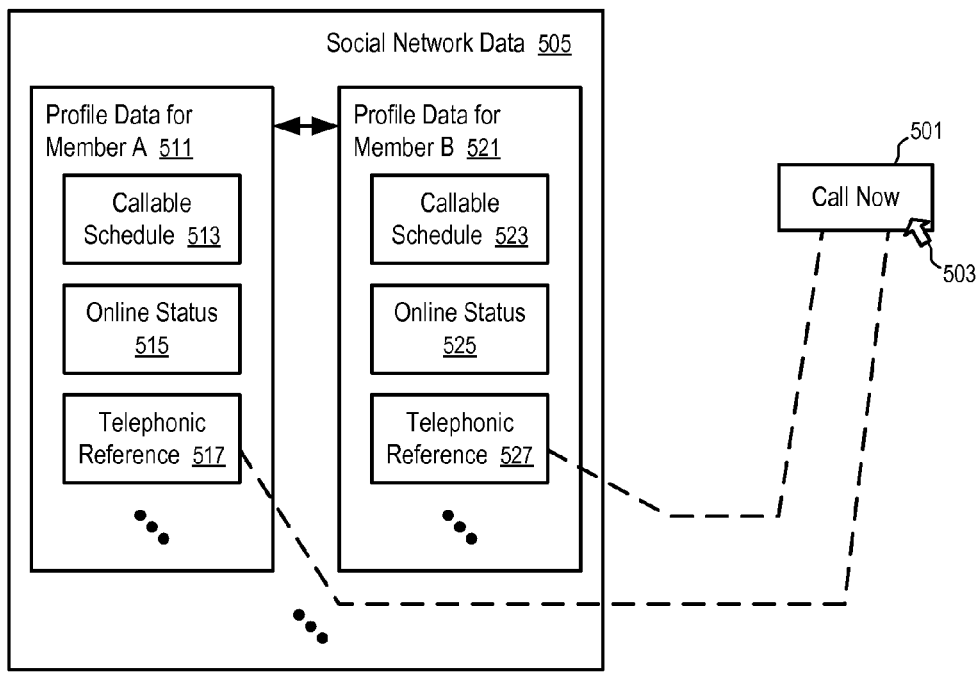
FIG. 17 illustrates a method to provide telephonic connections between members of a social network according to one embodiment.

FIG. 17 illustrates a method to provide telephonic connections between members of a social network according to one embodiment. In FIG. 17, the social network data (505) includes data representing the direct social connections in the social network. The profile data (e.g., 511 and 521) of the members are maintained in the accounts of the respective members.

In FIG. 17, the call button (501) is generated based on the telephonic references (517 and 527) in the profile data (511 and 521) of the members in the social network data (505). For example, the call button (501) can be dynamically generated and presented to one member when another member is being presented via a profile page, a list of friends, a question or answer posted on the social network, etc. The user of the call button (501) can use a cursor (503) to select the call button (501) using a cursor control device, such as a mouse, a touch screen, a track ball, a joystick, etc.

In one embodiment, when the call button (501) is selected, a message is sent to a connection server, which is configured to call member A using the telephonic reference (517) stored in the profile data of member A, call member B using the telephonic reference (527) stored in the profile data of member B, and join the calls to connect member A and member B for a telephonic conversation.

In one embodiment, the call button (501) includes identifications of the members (e.g., member IDs used in the social network to identify members). When the call button (501) is selected, the identifications of the members are transmitted to the connection server, which is configured to look up the telephonic references from the profile data of the members and provide the telephonic connection.

In another embodiment, the call button (501) includes a version of the telephonic references obtained from the social network profile data at the time the call button (501) is generated. When the call button (501) is selected, the telephonic references are transmitted to the connection server to provide the telephonic connection. In one embodiment, the telephonic references are included in the call button (501) in an encrypted or encoded format for enhanced privacy protection for the members.

In one embodiment, the call button (501) is generated when at least one of the members is online in the social network, based on the online status information (e.g., 515, 525). Alternatively, the call button (501) is generated, or becomes selectable, only when both the members are online in the social network.

In one embodiment, a member can specify a callable schedule in a way similar to a callable schedule for an advertiser. When a request for connection is received outside the callable schedule of the member, the connection server rejects the request.

In on embodiment, the call button (501) is generated, or activated to be selectable, based further on the callable schedule of the callee. For example, when the current time is outside the callable schedule (523) of member B, no call button (501) is generated, or activated to be selectable, for member A to request a connection to member B.

In one embodiment, a member can use online status to overwrite the callable schedule. For example, the member may indicate that when the member is online, the member is callable and the callable schedule is temporarily suspended; when the member is offline, the callable schedule is used to indicate the availability of the member to take calls.

In one embodiment, whether a member is currently available to take calls in indicated by the appearance of the call button. For example, when the member is currently callable, the call button may present the text of "call now"; and when the member is not currently callable, the call button may present the text of "call later".

In one embodiment, when the member is not currently callable, the call button can be selected to request a presentation of the callable schedule of the member.

In another embodiment, when the member is not callable, the call button is not displayed.

In one embodiment, the call button is valid for a predetermined period of time or for a session of visiting the social network. After the predetermined period of time, the validity of the call button can be extended for another period of time based on the availability of the callee (e.g., based on the callable schedule of the callee and/or the online status of the callee).

In one embodiment, a call button can be used to dynamically identify the callable friends of a member. For example, FIG. 18 illustrates a call button to request connections to friends of a member of a social network according to one embodiment.

Figure 18:
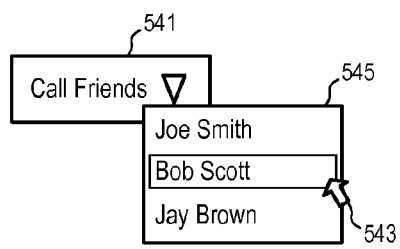
FIG. 18 illustrates a call button to request connections to friends of a member of a social network according to one embodiment.

In FIG. 18, when the call button (541) is selected by a member of the social network, the currently callable members are presented in a list (545). The user of the call button (541) can use the cursor (543) to select a callable member from the list.

In one embodiment, the list of callable members is dynamically generated at the time the call button (541) is selected. In one embodiment, the list of callable members is presented via a drop down menu. Alternatively, a dialog window can be used to present the list of callable members for selection. The callable members are identified based on the callable schedules and/or the online status of the friends of the member, who have direct social connections to the member in the social network.

In one embodiment, the user of the call button (541) can select more than one callable member from the list to request a conference connection. For example, the user can select one from the list to start a connection with the selected member and then select another from the list to add the later selected member to the conference. Alternatively, a user interface may be presented to allow the user to first select multiple members from the list and then select a button to request the conference connection.

In one embodiment, the list of callable members includes indication of connections statuses of the members. The list may indicate that a callable member is currently being connected to the user, currently in the process of being connected to the user, currently being connected to a different user by the system, or not yet being connected to other members via the connection server, etc.

Figure 19:
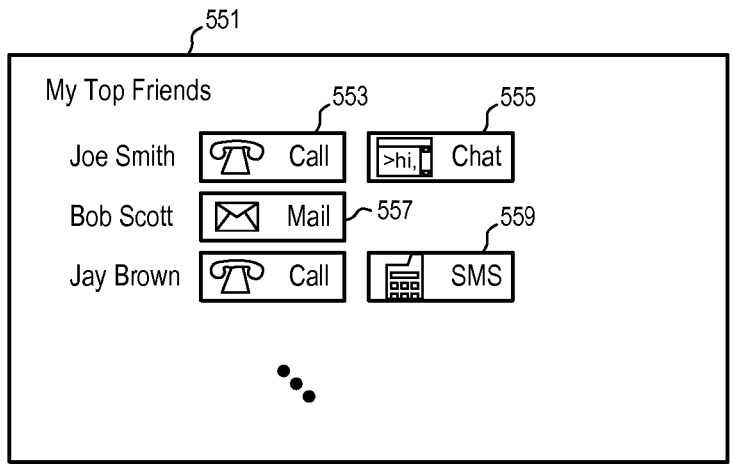
FIG. 19 illustrates a user interface to request connections to friends of a member of a social network according to one embodiment.

FIG. 19 illustrates a user interface to request connections to friends of a member of a social network according to one embodiment. In FIG. 19, a user interface (551) presents a list of friends of a user, which is a member of a social network. The friends are other members who are within one degree of separate from the user in the social network.

In FIG. 19, call buttons (e.g., 553) are displayed for friends who have at least one telephonic reference on file in their profile data. The call buttons can be used to request a telephonic connects between the user and the corresponding friends without revealing their telephonic references, such as telephone numbers with or without extension, Session Initiation Protocol (SIP) uniform resource identifier (URI), user ID of an instant messaging network, or user ID of a VoIP application, etc.

In FIG. 19, when a friend does not have a telephonic reference on file in their profile data, no call button is presented for the friend. In one embodiment, when the current time is not within the callable period of the friend, the call button for the friend is not displayed.

In FIG. 19, other types of buttons (e.g., 555, 557, 559) are also displayed when the friends enable the options to receive communications via other types of communication channels, such as text chat (e.g., 555), electronic mail (e.g., 557), short text message (e.g., 559). In one embodiment, the connection server bridges the communications transmitted via the use of the buttons, such that the communication references of the members are not reveal to each other.

For example, when the mail button (557) is used, an electronic mail message is sent to the connection server, which resends the message to the corresponding member (e.g., Bob Scott) without revealing the electronic mail address of the user to that member (e.g., Bob Scott).

For example, when the chat button (555) is used, the connection server establishes a chat connection with the user and another chat connection with the corresponding member (e.g., Joe Smith) and forwards the communications from one connection to another without revealing the user ID of the user to that member (e.g., Joe Smith) and without revealing the user ID of that member (e.g., Joe Smith) to the user.

In one embodiment, the connection server monitors the communications between the members of the social network to determine advertisements of interest to the members. For example, keywords in the communications can be extracted by the connection server to find matching advertisements for presentation to the members. The connection server may establish a profile of interest of the members of the social network. In one embodiment, the profile of interest is stored in the profile data of the corresponding member of the social network.

In one embodiment, the interface (551) is dynamically updated when social connections to new friends are added, when friends add or remove telephonic reference in their profile page, when friends change their callable schedule and/or online status.

In one embodiment, when one or more of the friends are already connected to the connection server for real time communications with other members or friends, their connection statuses are also presented to the user. The user may request the connection server to establish a connection to join the conversation in a conference.

Figure 20:
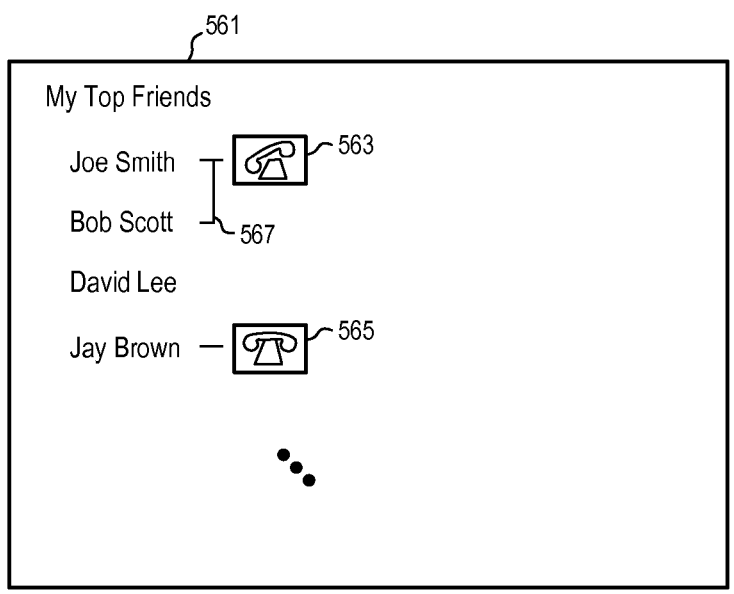
FIG. 20 illustrates a user interface to request a connection to join current connections to friends of a member of a social network according to one embodiment.

For example, FIG. 20 illustrates a user interface to request a connection to join current connections to friends of a member of a social network according to one embodiment.

In FIG. 20, the user interface (561) shows a list of friends of the user. Some of the friends are already being connected via the connection server. For example, Joe Smith and Bob Scott are currently being connected by the connection server for a telephone conversation. The indicator (567) groups the friends (Joe Smith and Bob Scott) to indicate that these friends are currently being connected to each other via a telephonic link; and the appearance of the icon button (563) indicates that the telephone conversation is currently live. The user can select the icon button (563) to request a connection to join the telephone conference.

In FIG. 20, the appearance of the icon button (565) indicates that the friend named Jay Brown is currently not being connected to the connection server via a telephone link. The user can request the connection server to connect the user to the friend named Jay Brown by selecting the icon button (565).

In one embodiment, when one or more friends are currently connected to the user via the connection server for a telephone conversation, these friends are grouped and identified via an icon.

Thus, the user of the interface (561) can use the interface (561) to identify any friends who are currently connected to the user for telephone conversation, friends who are currently connected to others for telephone conversation, and friends who are currently not being connected via the connection server. The icon buttons of the interface (561) can be used to request a telephone connection to join the existing telephone conferences, or start a new telephone conference with selected friends.

FIGS. 18-20 illustrate examples of presenting the friends of a member to the member for telephonic connections. In another embodiment, a similar interface can be used to request a list of friends of a friend of the member for telephonic connections. In one embodiment, the connection server provides free connections to friends who are within one degree of separation from the member, but charges a communication fee for connections to other members who are beyond one degree of separate from the member in the social network.

Figure 21:
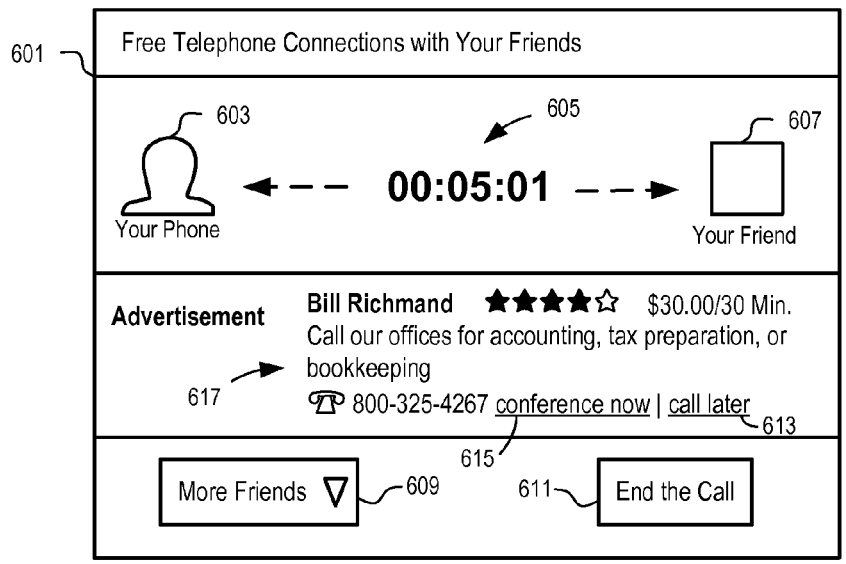
FIG. 21 illustrates a user interface to present the progress of a telephonic connection according to one embodiment.

FIG. 21 illustrates a user interface to present the progress of a telephonic connection according to one embodiment. In FIG. 21, the user interface (601) presents a graphical representation of the user (603) and a graphical representation of the friend (607). A duration (607) of the user being connected in the telephone conference is also presented.

In FIG. 21, the interface (601) presents an advertisement (617), which includes a rating of the advertiser, a brief description of the advertisement and a telephone number of the advertiser. In the example illustrated in FIG. 21, the advertiser sells services over telephone connections provided via the connection server; and a price of the service (e.g., $30.00 for 30 Minutes) is also presented. In other examples, the advertiser may not charge the user for talking to the advertiser.

In FIG. 21, the user can also use the icon button (609) to request the connection server to connect more friends into the telephone conference. The user can be disconnected from the telephone conference after the user selects the "end the call" button (611), or after other members in the telephone conference are disconnected from the conference.

In FIG. 21, the advertisement includes a link (615) which can be selected to request the connection provider to connect the advertiser/advisor/seller into the telephone conference. Alternatively, the user can select the link (613) to request connection server to make a connection to the advertiser after the user is disconnected from the telephone conference.

In one embodiment, the connection server extracts the keywords from the communications in the telephone conference to select the advertisements; and the advertisements can be updated periodically while the user is connected to the telephone conference. In one embodiment, the advertisements are selected based on the profile data of the members of the social network.

In another embodiment, the interface (601) is presented not only to the user who initiated the telephone conference but also to the callees of the telephone conference. For example, the call buttons are presented for connection to the callees who are also online in the social network environment. Thus, the connection server can make telephone connections to the callees and make separate data connection to the callees to present the interface with advertisements.

Figure 22:
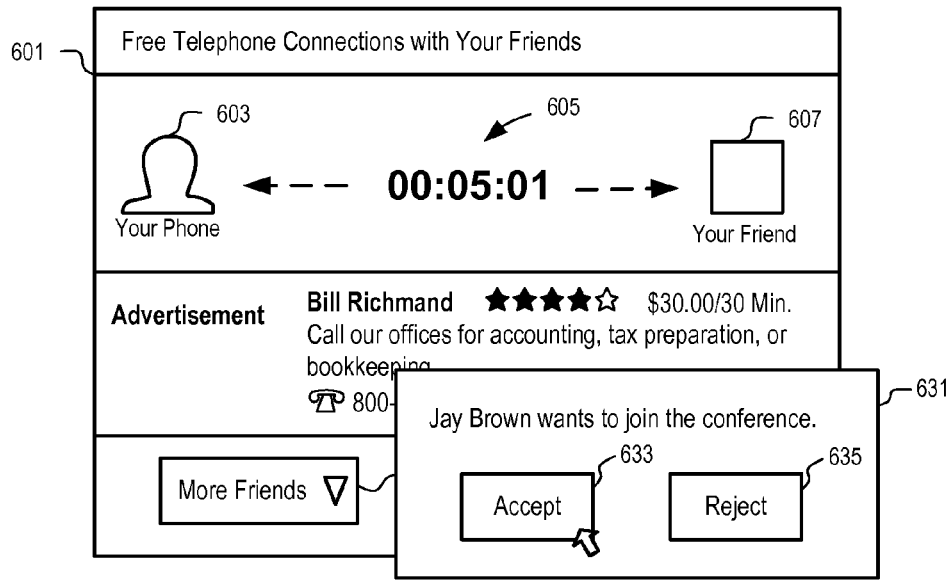
FIG. 22 illustrates a user interface to accept a request from a member to join the current telephonic conference according to one embodiment.

FIG. 22 illustrates a user interface to accept a request from a member to join the current telephonic conference according to one embodiment. In FIG. 22, a prompt window (631) is displayed when a friend of the user is requesting to join the telephone conference. The user can select the "accept" button (633) to allow the friend to enter the telephone conference, or select the "reject" button (636) to exclude the friend from the telephone conference.

Figure 23:
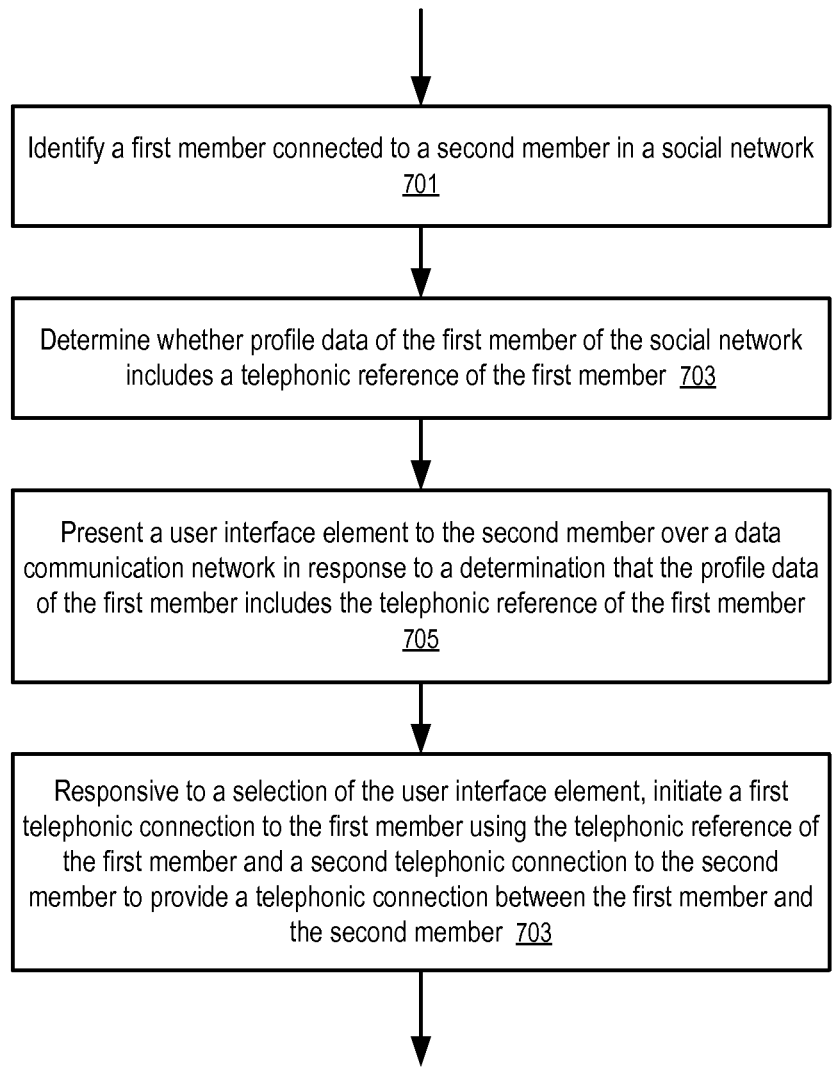
FIG. 23 illustrates a method to provide a connection between members of a social network according to one embodiment.

FIG. 23 illustrates a method to provide a connection between members of a social network according to one embodiment. In FIG. 23, a first member connected to a second member in a social network is identified (701). It is determined (703) whether profile data of the first member of the social network includes a telephonic reference of the first member. In response to a determination that the profile data of the first member includes the telephonic reference of the first member, a user interface element is presented (705) to the second member over a data communication network. Responsive to a selection of the user interface element, a connection server initiates (703) a first telephonic connection to the first member using the telephonic reference of the first member and a second telephonic connection to the second member to provide a telephonic connection between the first member and the second member.

In one embodiment, the telephonic reference of the first member is a telephone number without an extension, a telephone number with an extension, a session initiation protocol (SIP) uniform resource identifier (URI), a user identifier of an instant messaging network, or a Voice over Internet Protocol (VoIP) user identifier.

In one embodiment, it is further determined whether profile data of the second member of the social network includes a telephonic reference of the second member. The user interface element is presented to the second member in response to a determination that the profile data of the first member includes the telephonic reference of the first member and the profile data of the second member includes the telephonic reference of the second member. Thus, when the user interface element is selected, the second telephonic connection can be initiated using the telephonic reference of the second member.

In one embodiment, the user interface element includes an encrypted version of the telephonic reference of the first member and the telephonic reference of the second member. The connection server can decrypt the encrypted information to obtain the telephonic references of the first and second members, without having to look up the telephonic references from the social network.

In one embodiment, the user interface element includes a reference to the first member and a reference to the second member; when the user interface element is selected, the reference to the first member is used to look up the telephonic reference of the first member from the profile data of the first member in the social network; and the reference to the second member is used to look up the telephonic reference of the second member from the profile data of the second member in the social network. The telephone references looked up from the social network can be used to provide the telephonic connection.

In one embodiment, responsive to a selection of the user interface element, a list of members directly connected to the second member in the social network is presented. The list of members includes the first member, which can be selected to cause the connection server to initiate the first telephonic connection to the first member.

In one embodiment, responsive to a selection of a third member from the list of members, a third telephonic connection is initiated to the third member using a telephonic reference of the third member obtained from profile data of the third member; and the third telephonic connection is joined with the first and second telephonic connections to connect the first, second and third members.

In one embodiment, a list of members directly connected to the second member in the social network is determined and presented to the second member. The list of members includes the first member and the user interface element selectable to request the telephonic connection between the first member and the second member.

In one embodiment, the first member and the second member are not charged a fee for the initiating of the first and second telephonic connections to provide the telephonic connection between the first member and the second member.

In one embodiment, a list of members indirectly connected to the second member in the social network is determined and presented to the second member. The list of members includes the first member and the user interface element selectable to request the telephonic connection between the first member and the second member; and the second member is charged a communication fee for the telephonic connection provided between the first member and the second member.

In one embodiment, the user interface element is provided in a profile page of the first member presented to the second member. In one embodiment, a list of top friends of the second member is presented to the second user together with the user interface element provided as part of the presentation of the first member in the list.

In one embodiment, whether the first member is currently available to have a telephonic conversation with the second member is determined based on a callable schedule of the first member. The user interface element is presented to the second member in response to a determination that the first member is currently available.

In one embodiment, an appearance of the user interface element is updated to indicate availability of the first member to have a telephonic conversation, based on a callable schedule of the first member.

In one embodiment, response to the second member selecting the user interface element, the second member is prompted to specify a telephonic reference for a connection to the first member.

In one embodiment, a user interface is presented to the second member over a data communication connection to show progress of the telephonic connection. Response to a third member requesting a telephonic connection to the first member or the second member while the first member and the second member are connected by the telephonic connection, the second member is presented with an option to join the third member into a conference between the first member and the second member. In one embodiment, the option is presented via the user interface showing the progress of the telephonic connection.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A method, comprising:

storing, in a database of a server system, data representing a social network of a plurality of members, including a first member and a second member;

generating, by the server system, a page for presentation in a social network environment in which the first member is connected to the second member in the social network, the generating comprising:

retrieving, from the database, first member information pertaining to the first member, the first member information previously stored in association with identification information for the first member;

retrieving, from the database, second member information pertaining to the second member, the second member information previously stored in association with identification information for the second member;

processing the first member information to identify whether or not to generate code for a user interface element including a call button in the page to be presented with an end-user device associated with the second member, the identifying based at least in part on whether profile data of the first member information includes a telephonic reference of the first member; and consequent to identification that the telephonic reference is included in the profile data of the first member information, generating the code to be included in the page, the code to display the call button with the page;

transmitting, by the server system, the user interface element including the call button in the page to the end-user device associated with the second member over a data communication network in response to the identification that the profile data of the first member includes the telephonic reference of the first member; and receiving, by the server system, an indication of an operation of the call button responsive to a selection of the user interface element, and initiating, by a connection server of the server system, a first telephonic connection to an end-user device associated with the first member using the telephonic reference of the first member and a second telephonic connection to the end-user device associated with the second member to provide a telephonic connection between the first member and the second member.

2. The method of claim 1, wherein the telephonic reference of the first member comprises a telephone number without an extension, a telephone number with an extension, a session initiation protocol (SIP) uniform resource identifier (URI), a user identifier of an instant messaging network, or a Voice over Internet Protocol (VoIP) user identifier.

3. The method of claim 1, further comprising:
processing the second member information to identify whether profile data of the second member of the social network includes a telephonic reference of the second member;
wherein the code for the user interface element is generated in response to a determination that the profile data of the first member includes the telephonic reference of the first member and the profile data of the second member includes the telephonic reference of the second member; and
wherein the second telephonic connection is initiated using the telephonic reference of the second member.

4. The method of claim 3, wherein the user interface element includes an encrypted version of the telephonic reference of the first member and the telephonic reference of the second member.

5. The method of claim 3, wherein the user interface element includes a reference to the first member and a reference to the second member; when the user interface element is selected, the reference to the first member is used to look up the telephonic reference of the first member from the profile data of the first member in the social network and the reference to the second member is used to look up the telephonic reference of the second member from the profile data of the second member in the social network to provide the telephonic connection.

6. The method of claim 1, wherein the selection of the user interface element corresponds to a subsequent selection, the method further comprising:
transmitting a list of members directly connected to the second member in the social network for presentation responsive to a previous selection of the user interface element, the list of members including the first member;
wherein the initiating the first telephonic connection to the first member is in response to the subsequent selection, which corresponds to a selection of the first member from the list of members.

7. The method of claim 6, further comprising:
responsive to a selection of a third member from the list of members, initiating a third telephonic connection to an end-user device associated with the third member using a telephonic reference of the third member obtained from profile data of the third member; and
joining the third telephonic connection with the first and second telephonic connections to connect the end-user devices respectively associated with the first, second, and third members.

8. The method of claim 1, further comprising:
determining a list of members directly connected to the second member in the social network, the list of members including the first member; and
transmitting the list of members to the end-user device associated with the second member, the list of members including the user interface element selectable to request the telephonic connection between the end-user devices respectively associated with the first member and the second member.

9. The method of claim 8, wherein the first member and the second member are not charged a fee for the initiating of the first and second telephonic connections to provide the telephonic connection between the first member and the second member.

10. The method of claim 1, further comprising:
determining a list of members indirectly connected to the second member in the social network, the list of members including the first member; and
transmitting the list of members to the end-user device associated with the second member, the list of members including the user interface element selectable to request the telephonic connection between the end-user devices respectively associated with the first member and the second member.

11. The method of claim 8, wherein the second member is charged a communication fee for the telephonic connection provided between the first member and the second member.

12. The method of claim 1, wherein the user interface element is presented in a profile page of the first member.

13. The method of claim 1, further comprising:
transmitting to the end-user device associated with the second member a list of top friends of the second member, the list of top friends including the first member;
wherein the user interface element is provided to present the first member in the list of top friends.

14. The method of claim 1, further comprising:
determining whether the first member is currently available to have a telephonic conversation with the second member based on a callable schedule of the first member;
wherein the user interface element is presented to the second member in response to a determination that the first member is currently available.

15. The method of claim 1, further comprising:
updating an appearance of the user interface element to indicate availability of the first member to have a telephonic conversation based on a callable schedule of the first member.

16. The method of claim 1, further comprising:
responsive to the selection or another selection of the user interface element, prompting the second member to specify a telephonic reference for a connection to the first member.

17. The method of claim 1, further comprising:
exposing a user interface to the second member over a data communication connection to show progress of the telephonic connection.

18. The method of claim 17, further comprising:
responsive to a request from an end-user device associated with a third member requesting a telephonic connection directed to the first member or the second member while the end-user devices respectively associated with the first member and the second member are connected by the telephonic connection, causing presentation of an option to join the end-user device associated with the third member into a conference between the end-user devices respectively associated with the first member and the second member;
wherein the option is presented via the user interface.

19. A non-transitory machine readable media embodying instructions, the instructions causing a server system to perform a method, the method comprising:

storing, in a database of the server system, data representing a social network of a plurality of members, including a first member and a second member;

generating, by the server system, a page for presentation in a social network environment in which the first member is connected to the second member in the social network, the generating comprising:

retrieving, from the database, first member information pertaining to the first member, the first member information previously stored in association with identification information for the first member;

retrieving, from the database, second member information pertaining to the second member, the second member information previously stored in association with identification information for the second member;

processing the first member information to identify whether or not to generate code for a user interface element including a call button in the page to be presented with an end-user device associated with the second member, based at least in part on whether profile data of the first member information includes a telephonic reference of the first member; and consequent to identification that the telephonic reference is included in the profile data of the first member information, generating code to be included in the page, the code to display the call button with the page;

transmitting, by the server system, the user interface element including the call button in the page to the end-user device associated with the second member over a data communication network in response to the identification that the profile data of the first member includes the telephonic reference of the first member; and receiving, by the server system, an indication of an operation of the call button responsive to a selection of the user interface element, and initiating, by a connection server of the server system, a first telephonic connection to an end-user device associated with the first member using the telephonic reference of the first member and a second telephonic connection to the end-user device associated with the second member to provide a telephonic connection between the first member and the second member.

20. A system, comprising:

a server system comprising a connection server, a database, and memory storing instructions configured to instruct the server system to perform operations including:

storing, in the database, data representing a social network of a plurality of members, including a first member and a second member;

generating, by the server system, a page for presentation in a social network environment in which the first member is connected to the second member in the social network, the generating comprising:

retrieving, from the database, first member information pertaining to the first member, the first member information previously stored in association with identification information for the first member;

retrieving, from the database, second member information pertaining to the second member, the second member information previously stored in association with identification information for the second member;

processing the first member information to identify whether or not to generate code for a user interface element including a call button in the page to be presented with an end-user device associated with the second member, based at least in part on whether profile data of the first member information includes a telephonic reference of the first member; and consequent to identification that the telephonic reference is included in the profile data of the first member information, generating code to be included in the page, the code to display the call button with the page;

transmitting, by the server system, the user interface element including the call button in the page to the end-user device associated with the second member over a data communication network in response to the identification that the profile data of the first member includes the telephonic reference of the first member; and receiving, by the server system, an indication of an operation of the call button responsive to a selection of the user interface element, and initiating, by a connection server of the server s stem a first telephonic connection to an end-user device associated with the first member using the telephonic reference of the first member and a second telephonic connection to the end-user device associated with the second member to provide a telephonic connection between the first member and the second member.

\* \* \* \* \*